United States Patent
K et al.

(10) Patent No.: US 12,081,996 B2
(45) Date of Patent: Sep. 3, 2024

(54) SIMULTANEOUS SHARING OF SPECTRUM IN WIRELESS COMMUNICATIONS

(71) Applicant: INDIAN INSTITUTE OF TECHNOLOGY MADRAS, Chennai (IN)

(72) Inventors: Giridhar K, Chennai (IN); Venkatesh C R, Chennai (IN)

(73) Assignee: INDIAN INSTITUTE OF TECHNOLOGY MADRAS, Chennai (IN)

( * ) Notice: Subject to any disclaimer, the term of this patent is extended or adjusted under 35 U.S.C. 154(b) by 0 days.

(21) Appl. No.: 18/471,116

(22) Filed: Sep. 20, 2023

(65) Prior Publication Data

US 2024/0015521 A1    Jan. 11, 2024

Related U.S. Application Data

(62) Division of application No. 17/310,362, filed as application No. PCT/IN2020/050153 on Feb. 19, 2020, now Pat. No. 11,937,093.

(30) Foreign Application Priority Data

Feb. 19, 2019    (IN) .............. 201941006506

(51) Int. Cl.
  *H04W 16/14*    (2009.01)
  *H04W 16/12*    (2009.01)
  *H04W 16/32*    (2009.01)

(52) U.S. Cl.
  CPC ........... *H04W 16/14* (2013.01); *H04W 16/12* (2013.01); *H04W 16/32* (2013.01)

(58) Field of Classification Search
  None
  See application file for complete search history.

(56) References Cited

U.S. PATENT DOCUMENTS

| 7,962,170 B2 | 6/2011 | Axness et al. |
| 10,182,448 B2 | 1/2019 | Zhu et al. |
| 2006/0172772 A1* | 8/2006 | Bjorkner ............... H04W 8/205 455/558 |

(Continued)

FOREIGN PATENT DOCUMENTS

| EP | 3376698 A1 | 9/2018 |
| IN | 6122/CHENP/2011 | 12/2012 |

(Continued)

OTHER PUBLICATIONS

Sanguanpuak et al., "Multi-Operator Spectrum Sharing for Small Cell Networks: A Matching Game Perspective", IEEE Transactions on Wireless Communications, vol. 16, No. 6, pp. 3761-3774, 2017.

(Continued)

*Primary Examiner* — Jamaal Henson
(74) *Attorney, Agent, or Firm* — Knobbe Martens Olson & Bear LLP

(57) ABSTRACT

Systems for simultaneous sharing of spectrum in wireless communications. Base Stations (BSs) of a plurality of mobile network operators in a cell may send downlink signals to their respective connected User Equipments (UEs) through a shared frequency spectrum. Further, the BSs may receive uplink signals from the UEs in the shared frequency spectrum.

3 Claims, 18 Drawing Sheets

(56) References Cited

U.S. PATENT DOCUMENTS

| | | |
|---|---|---|
| 2009/0186623 A1 | 7/2009 | Matsuzawa |
| 2009/0191906 A1 | 7/2009 | Abed |
| 2010/0113060 A1 | 5/2010 | Bai et al. |
| 2010/0216478 A1 | 8/2010 | Buddhikot et al. |
| 2011/0081951 A1* | 4/2011 | Hwang ................ H04W 8/183 |
| | | 455/558 |
| 2011/0223866 A1* | 9/2011 | Cho ..................... H04M 1/724 |
| | | 455/41.3 |
| 2012/0142308 A1* | 6/2012 | Lee ....................... H04W 4/90 |
| | | 455/404.1 |
| 2012/0142348 A1* | 6/2012 | Park ................. H04W 52/0209 |
| | | 455/435.1 |
| 2012/0178500 A1* | 7/2012 | Hwang ................ H04W 8/183 |
| | | 455/558 |
| 2013/0273953 A1 | 10/2013 | Srikanteswara et al. |
| 2014/0323140 A1 | 10/2014 | Yan et al. |
| 2015/0289141 A1 | 10/2015 | Ghasemzadeh et al. |
| 2016/0345189 A1 | 11/2016 | Miyagawa et al. |
| 2017/0013465 A1 | 1/2017 | Luo et al. |
| 2017/0013468 A1 | 1/2017 | Zhu et al. |
| 2017/0048722 A1 | 2/2017 | Van Phan et al. |
| 2017/0094681 A1 | 3/2017 | Takeda et al. |
| 2017/0238330 A1 | 8/2017 | Jiang et al. |
| 2018/0092093 A1 | 3/2018 | Ramaswamy et al. |
| 2018/0160422 A1* | 6/2018 | Pathak .................. H04W 76/10 |
| 2022/0109999 A1 | 4/2022 | Giridhar et al. |
| 2024/0015522 A1 | 1/2024 | Giridhar et al. |

FOREIGN PATENT DOCUMENTS

| | | |
|---|---|---|
| KR | 100766840 B1 | 10/2007 |
| KR | 20100113137 A | 10/2010 |
| WO | WO 2008/041281 A1 | 1/2010 |
| WO | WO 2018/071304 A1 | 4/2018 |

OTHER PUBLICATIONS

International Search Report received in Application No. PCT/IN2020/050153 (PD031484PCT) mailed on May 11, 2020 in 3 pages.

Written Opinion received in Application No. PCT/IN2020/050153 (PD031484PCT) mailed on May 11, 2020 in 7 pages.

* cited by examiner

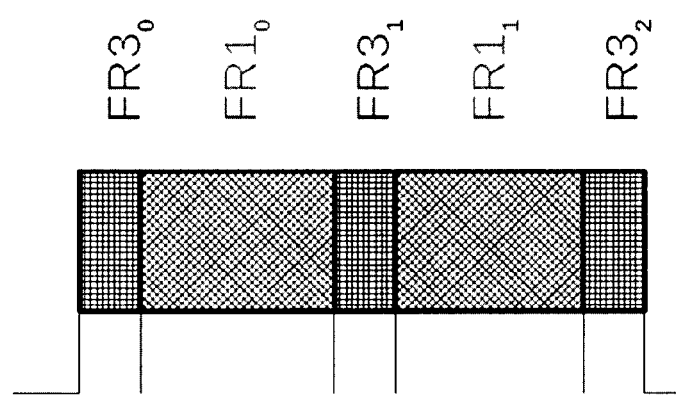

SIMULTANEOUS SHARING OF SPECTRUM IN WIRELESS COMMUNICATIONS

CROSS-REFERENCE TO RELATED APPLICATIONS

This application is a divisional of U.S. application Ser. No. 17/310,362, filed on Jul. 29, 2021 as the U.S. National Phase under 35 U.S.C. § 371 of International Application PCT/IN2020/050153, filed Feb. 19, 2020, which claims priority to Indian Patent Application No. 201941006506, filed Feb. 19, 2019, which are hereby incorporated by reference in their entirety.

TECHNICAL FIELD

The present invention relates, in general, to simultaneous sharing of a given bandwidth or spectrum in the same geographical region by multiple transmit-receive pairs.

BACKGROUND

In a Single-Operator (SO) wireless communication system, such as the current fourth generation-long term evolution (4G-LTE) mobile cellular system, each network operator in a macro cell is allotted a band or spectrum. Each operator will be allotted one band, and which is not licensed to any other operator in the given geographical area. The allotted band is then considered to be orthogonally licensed to that particular operator. Within the cellular network in a given geographical area, a user equipment (UE) associated with an operator can connect only to a Base Station (BS) associated with that operator and can communicate through the corresponding licensed spectrum. The UE is associated with its parent operator through registration, for example, via a Subscriber Identity Module (SIM) card.

BRIEF DESCRIPTION OF DRAWINGS

A detailed description is given with reference to the accompanying figures. In the figures, the left-most digit(s) of a reference number identifies the figure in which the reference number first appears. The same numbers are used throughout the drawings to reference like features and components.

FIG. 10(a) illustrates Fractional Frequency Reuse (FFR) spectrum partitioning for four operators, in accordance with an implementation of the present subject matter.

DETAILED DESCRIPTION

Figure 1:
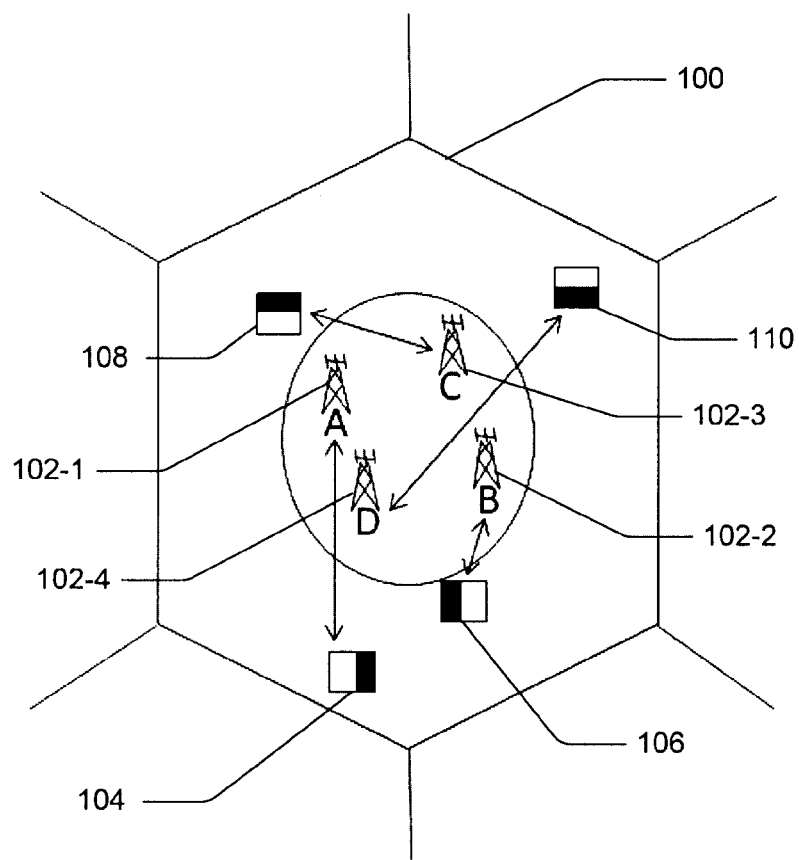
FIG. 1 illustrates a cell simultaneously being served on the same band by four different operators, in accordance with an implementation of the present subject matter.

A mobile broadband wireless access system generally employs a cellular network including a plurality of cells. Each cell represents a geographical area with a hexagonal shape. Within each cell, there may be a number of base stations (BSs) belonging to various mobile network operators, interchangeably referred to as operators.

In a Single Operator (SO) communication system, such as the current 4G-LTE network system, different operators utilize their corresponding licensed bands. Since each operator is restricted to use only a certain band of spectrum, a user equipment (UE) can connect only to its parent operator. Such a connection may happen via a registration by means of a Subscriber Identity Module (SIM) card.

In the conventional SO system, the connection between the UE and its parent operator happens through a signal known as a synchronization signal or a preamble signal. The synchronization signals are used by the UE which is trying to enter the network to get synchronized to a Base Station (BS) belonging to its parent operator, for establishing a connection. Synchronization signals and data from different operators are on different frequency bands. Accordingly, generally, a UE can detect synchronization signals coming only from the parent operator associated with the UE, and not from other operators.

In the conventional SO system, even though the UE may be radio-distance wise closer to a BS of a different operator, and therefore sees a stronger signal from that BS, the UE may not be able to connect to BS of any operator other than its parent operator. This is because, both operators are working in different frequencies, and generally in native network region, roaming capability is not enabled.

Further, to ensure that no two operators licensed adjacent bands suffer from adjacent channel interference related problems, some guard spectrum is usually provided between such adjacent bands. This results in wastage of prime spectrum, and also limits the number of users that can be served in the given geographical area in the given band.

The present subject matter discloses simultaneous sharing of a spectrum among multiple (e.g., 2 to 6) different wireless network operators. The sharing of spectrum is referred to as simultaneous because the spectrum is shared by multiple network operators at the same time in a given geographical region.

In accordance with the present subject matter, a system includes a first Base Station (BS) belonging to a first mobile network operator and a second BS belonging to a second mobile network operator. The first BS and the second BS may be disposed in a first cell, which may be a geographical area including an interior region having a predetermined area surrounding a centre of the cell and a first exterior region including at least a portion of a remainder of the first cell.

The first BS and the second BS may send their respective downlink signals in a same frequency spectrum, also referred to as spectrum. For instance, the first BS may send downlink signals to a first User Equipment (UE) in the interior region in a first band of a frequency spectrum and send downlink signals to a second UE in the first exterior region in a second band of the frequency spectrum. Similarly, the second BS may send downlink signals to a third UE in the interior region in the first band and send downlink signals to a fourth UE in the first exterior region in the second band. The BSs may also receive uplink signals in the shared frequency spectrum. The spectrum may be a sub-1 GHz spectrum.

The simultaneous sharing of the spectrum may enable a UE to connect to the BS which provides signal of highest strength, regardless of the mobile network operator to which it belongs. For instance, the UE may search for a first preamble signal from a base station (BS) of a first mobile network operator that issued a first Subscriber Identity Module (SIM) card being used in the UE. The first preamble signal has a first set of sub-bands in a frequency spectrum.

Upon receiving the first preamble signal from the first BS of the first mobile network operator, the first UE may register with the first BS for receiving downlink signals and for sending uplink signals. The first BS communicates with the UE in the frequency spectrum.

Subsequently, the UE may receive a second preamble signal from the second BS. The second preamble signal has a second set of sub-bands in the frequency spectrum. Based on the second preamble signal, if the UE determines that downlink signals to be received from the second BS are to have a higher strength than that from the first BS, the UE may request the first BS a permission to be served by the second BS. Upon receiving the permission from the first BS, the UE may register with the second BS and receive downlink signals from the second BS in the frequency spectrum. Accordingly, the simultaneous sharing of the spectrum enables a UE to connect to the operator providing the "best" link. The BS that provides the signals with the highest strength to a UE may be referred to as the strongest BS.

The present approach can help in reducing the cost of ownership of premium spectrum bands, such as below 1 GHz bands, and particularly in the coveted TV-Ultra High Frequency (TV-UHF) band where re-farming of spectrum is possible. Further, the present approach can provide different services, such as mobile voice and data services, to the UE of any operator under the shared spectrum.

In the present subject matter, the preamble signals from the different operators are transmitted in different sub-bands of the shared spectrum such that they do not interfere. The payload or data signals, on the other hand, are simultaneously transmitted on the entire shared spectrum, and they could overlap with each other causing interference on one another. This interference is managed and mitigated, allowing each operator gets the benefit of utilizing the entire shared spectrum.

The signal processing techniques disclosed in the present subject matter can prevent any loss in per-operator throughput, i.e., traffic carrying capacity. Further, the present approach can provide highly reliable coverage in every geographical region. Further, the present approach can mitigate interference effects that can occur while sharing of spectrum non-orthogonally.

Some example implementations of the present subject matter are described with regard to a scenario in which a given spectrum is shared among four different network operators, each having a base station in each cell. In an example implementation of the present subject matter, a traditional 19-cell network model is described, each cell having four different network operators. It is to be noted that these example implementations can be used for any number of operators, with any number of cells.

FIG. 1 illustrates a first cell 100 with base stations of four different operators, in accordance with an implementation of the present subject matter. The first cell 100 is a geographical area and has a plurality of base stations disposed therein. The plurality of base stations includes a first base station (BS) 102-1, a second BS 102-2, a third BS 102-3, and a fourth BS 102-4 associated with a first mobile network operator (also referred to as operator A), a second mobile network operator (also referred to as operator B), a third mobile network operator (also referred to as operator C), and fourth mobile network operator (also referred to as operator D), respectively. A mobile network operator may be interchangeably referred to as an operator.

In wireless communication system, a cell is the geographical area covered by a transmitter of a BS associated with an operator. The cell may be hexagon-shaped. A User equipment (UE) may be able to communicate with a certain operator if the UE is registered with that operator. For the purposes of explanation, four UEs are considered to be interacting with the four operators. The four UEs may be a user equipment (UE) 104, a UE 106, a UE 108, and a UE 110. The parent operator corresponding to the UE 104 is the operator A, the parent operator corresponding to the UE 106 is the operator B, the parent operator corresponding to the UE 108 is the operator C, and the parent operator corresponding to the UE 110 is the operator D. A parent operator of a UE may refer to an operator whose Subscriber Identity Module (SIM) card is being used in the UE.

Each BS may include a plurality of antennas, where each antenna serves a region of the cell. The region of the cell being served by an antenna may be sector-shaped. Accordingly, the antenna may be referred to as a sector antenna. The present subject matter has been explained with respect to a three-sector configuration (in which a cell is divided into three sectors and is being served by three antennas of a BS) and a 12-sector configuration. However, it will be understood that the present subject matter can be implemented for other configurations as well.

Figure 2:
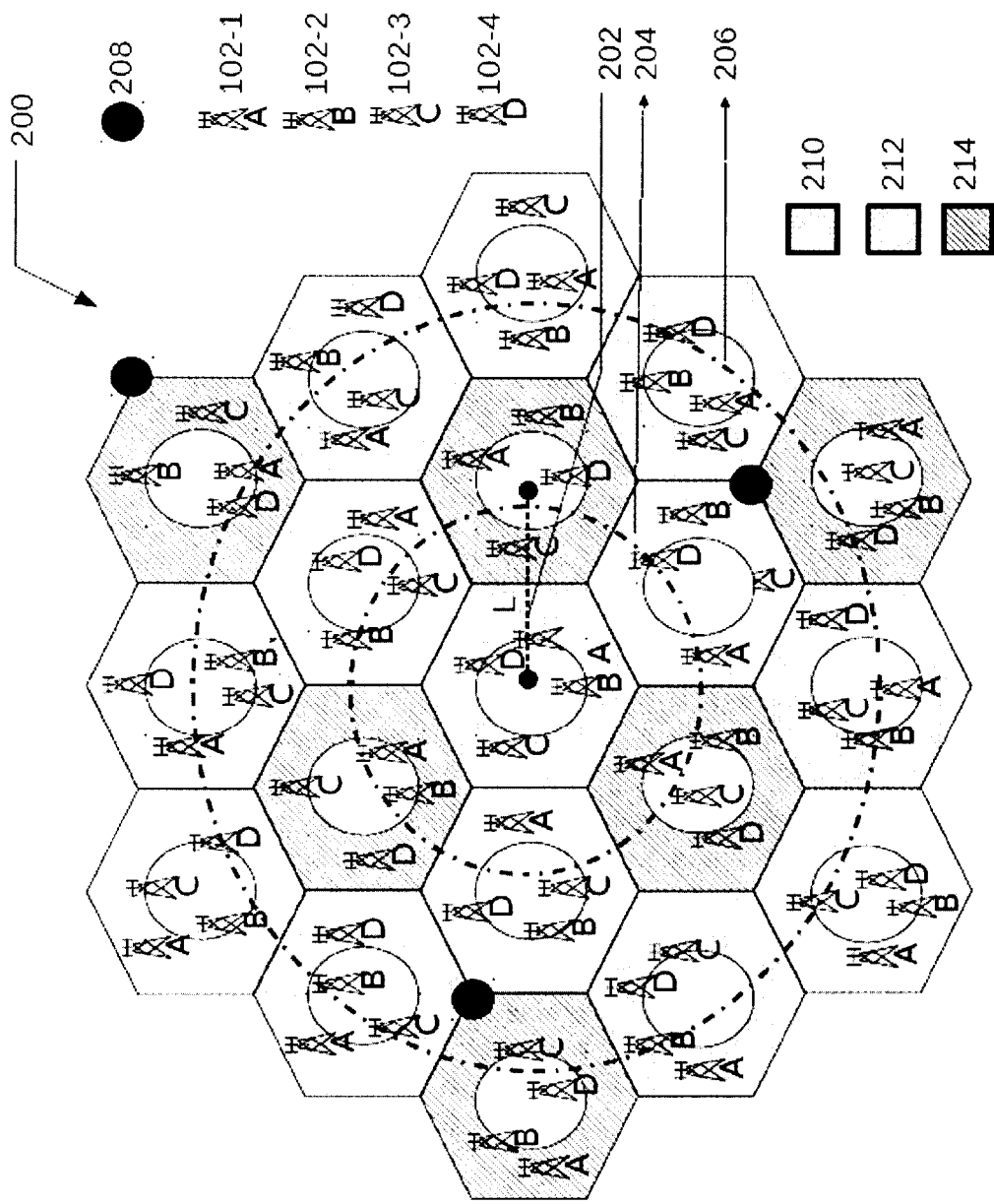
FIG. 2 illustrates a 19-cell network model with base stations (BSs) of four different operators placed in each cell, in accordance with an implementation of the present subject matter.

FIG. 2 illustrates a traditional 19-cell network model within a geographical region. Each cell includes BS's of four different operators A, B, C, and D, distributed randomly within the geographical region. Further, the 19-cell network model includes a middle hexagon 202, a first tier 204 including six hexagons surrounding the middle hexagon, and a second tier 206 including twelve hexagons surrounding the first tier 204. Further, the 19-cell network model may include an Inter Operator Negotiator (ION) 208. Each ION 208 can monitor and coordinate a large group of the BSs of all the operators. The ION can enable memorandum of understanding (MoU) between the operators for simultaneously sharing the spectrum.

A spectrum is allotted to a given set of operators, such as the operators A, B, C, and D, for example, by a governmental authority. In an example, the spectrum may be a UHF spectrum with frequencies ranging between 400 MHz to 800 MHz. Further, the bandwidth of the shared spectrum may be 40 MHz.

In an implementation, each of the four UEs can see the entire allotted spectrum for the given geographical region. Further, frequency planning for each cell is shown. A first pattern 210, a second pattern 212, and a third pattern 214 are shown which are indicative of frequency planning in case of the system with both a three-sector configuration and a twelve-sector configuration. Frequency planning is a process where different sub-bands are enabled in different cells to enable the spectrum sharing network. The frequency planning will be explained later. Further, a UE will be able to connect to the BS having the strongest signal within the network, only when the four different operators agree for certain levels of cooperation. In an example, the levels of cooperation may include level-0, level-1, and level-2 co-operation as explained above.

Figure 3A:
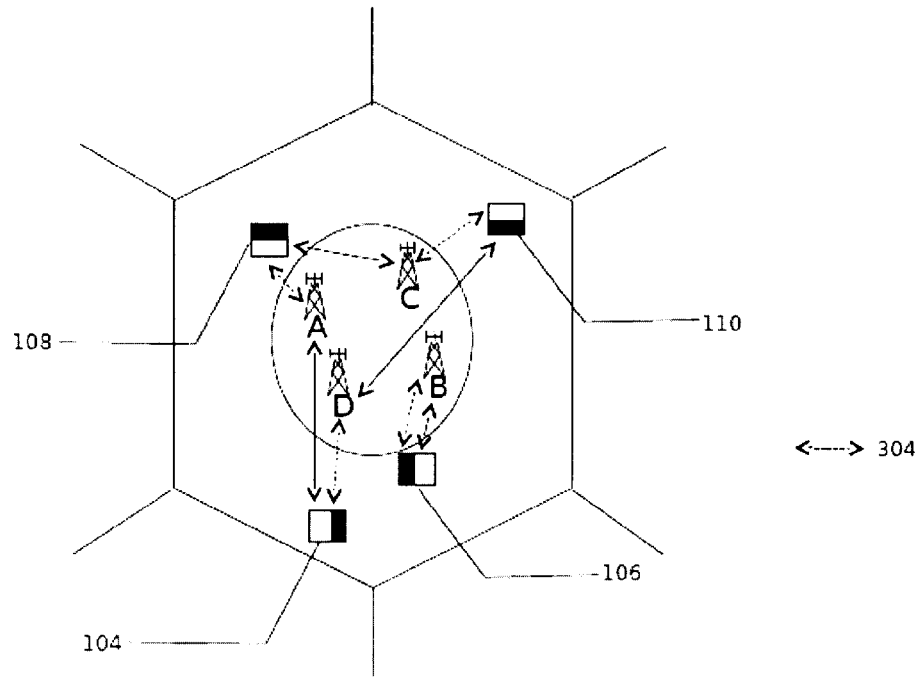
FIG. 3(a) illustrates a level-0 cooperation and a level-1 cooperation among the four different operators, in accordance with an implementation of the present subject matter.

FIG. 3(a) illustrates Level-1 cooperation 304, in accordance with an implementation of the present subject matter. The Level-0 cooperation may refer to the minimum cooperation required between the operators to facilitate the simultaneous sharing of spectrum. Under the Level-0 cooperation 302, the BSs corresponding to the different operators are required to fulfil the following basic requirements:

A time-synchronized common frame boundary across the network with adequate frequency accuracy.
 Sharing of the Uplink/Downlink configuration across the network.
 Preamble, ranging, pilot and control signals formats are common across operators.

For achieving the Level-0 cooperation, frames transmitted by the BSs, irrespective of the operator, are to be synchronous within a timing accuracy, for example, within a few hundred nanoseconds. Further, the accuracy of the transmitted frequency is to be such that the carrier frequency error between the BSs is negligible.

Level-1 cooperation 304 allows a UE to connect to the strongest BS, regardless of the operator to which the BS belongs to. Here, strongest BS may refer to the BS that sends signals to the UE with the highest signal strength. The strongest BS may be determined based on received power or SINR of preamble signal, as will be explained later. The Level-1 cooperation may also be referred to as user sharing between the operators. As illustrated by arrows 304, each UE is connected to its most proximate BS, which may provide the strongest signal.

For Level-1 cooperation on the downlink (DL), a packet may be routed from BS of the parent operator to the serving BS of the serving operator. Here, serving BS refers to the BS with which the UE is connected for receiving DL signals and for sending UL signals, and the serving operator is the operator to which the serving BS belongs. A BS may become a serving BS for a UE upon connection of the UE with the BS and upon performance of a ranging operation by the UE, as would be understood by a person skilled in the art.

Figure 3B:
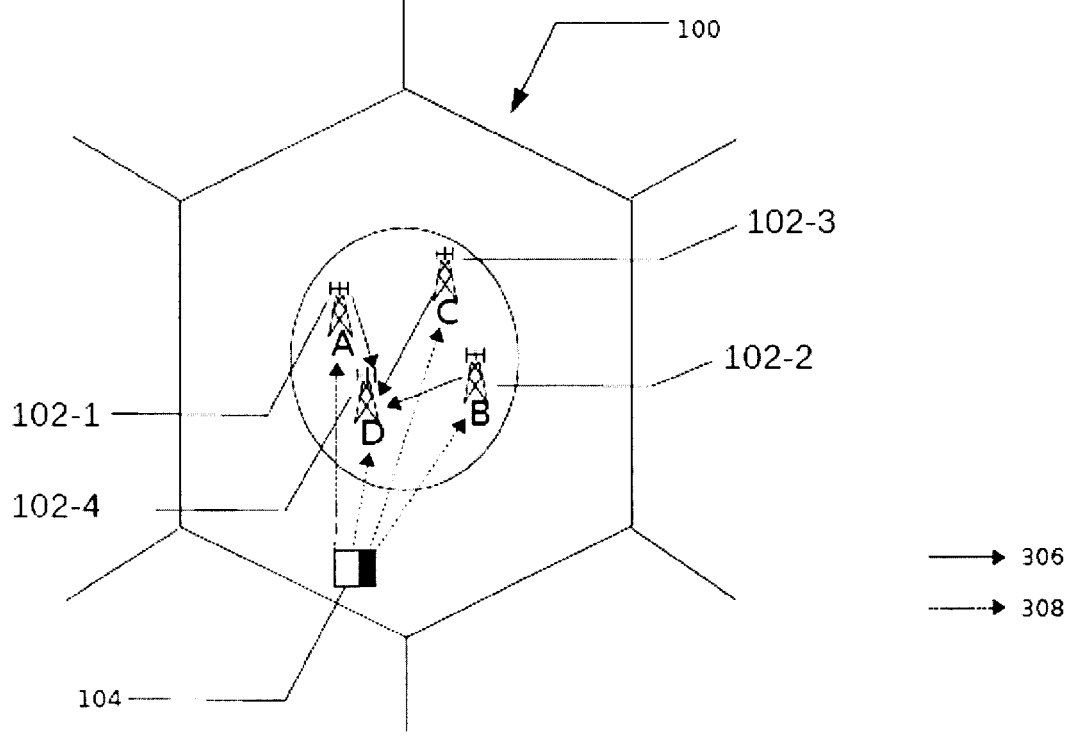
FIG. 3(b) illustrates a level-2 cooperation among the four different operators, in accordance with an implementation of the present subject matter.

FIG. 3(b) illustrates Level-2 cooperation 306 between the four operators for uplink communications, in accordance with an implementation of the present subject matter. In the level-2 cooperation, a serving BS may receive an uplink signal from a UE. The serving BS may also determine a strength with which the second BS received the uplink signal. In response to a determination that the strength with which the second BS received the uplink signal is greater than a threshold, the serving BS may utilize the information received from the uplink signal received by the second BS to decode the uplink signal received by the serving BS. This will be described below:

During uplink, while different BSs decode their respective scheduled uplink signal (for connected UEs), they compute the LLR for the non-connected UEs as well. Accordingly, when the serving BS (in this case, the fourth BS 102-4) grants a resource to a UE for uplink, the serving BS considers the strength of the uplink signal sent by the UE as seen by the neighbouring BSs, such as the BSs 102-1, 102-2 and 102-3, in the first cell 100. For determining the strength of the uplink signal, strength of the uplink pilot signals may be utilized. The uplink pilot signals are explained with reference to FIG. 7(b).

Based on the signal strength, each BS may compute a log-likelihood-ratio (LLR) for the received uplink signal and may share the LLR with the serving BS. The LLR may refer to Log Likelihood Ratio of the received digitally modulated signal, as will be understood by a person skilled in the art. The serving BS computes the LLR for the UE and combines the LLR received from other BSs for that particular UE. Accordingly, the LLR received from the other BSs may be utilized by the serving BS for decoding the uplink signal sent by the UE.

By LLR sharing, the uplink gets spatial diversity. By sharing the LLR values from different BSs the uplink quality increases, i.e., the probability of decoding an uplink signal without error increases. This reduces the number of re-transmission requests sent to the UEs and directly improves the throughput of the network in the uplink.

To facilitate the simultaneous sharing of spectrum, the present subject matter involves sending of preamble signals of various operators in orthogonal sub-bands. The preamble signal is a signal known both to the BS and the UE and enables timing and frame synchronization between BS and UE. The manner in which preamble signals of various operators are configured to be transmitted may be referred to as preamble planning.

Figure 4A:
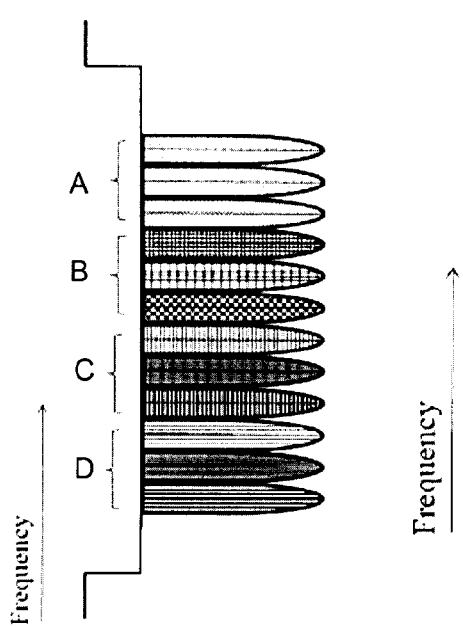
FIG. 4(a) illustrates a preamble planning in case of orthogonality in frequency for the BSs of four operators in a cell for a three-sector configuration, in accordance with an implementation of the present subject matter.

FIG. 4(a) illustrates a preamble planning in case of orthogonality in frequency for the BSs of four operators in a cell for a three-sector configuration, in accordance with an implementation of the present subject matter.

The total bandwidth is shown in the y-axis. The total bandwidth may be the frequency spectrum that is shared between the operators. A portion of the bandwidth is divided into four group of sub-bands (A, B, C, and D), one group for BS of each of the four operators. Each group is further divided into three sub-bands, owing to the three-sector configuration which has been employed in each of the BSs. For instance, a group of sub-bands allocated to the first operator is divided into a first sub-band, a second sub-band, and a third sub-band. Further, the first sub-band is allocated to an antenna of the first BS 102-1 (that belongs to the first operator) that is to serve first sector (not shown in FIG. 4(a)) of the cell, the second sub-band is allocated to an antenna of the first BS that is to serve a second sector of the cell, and the third sub-band is allocated to an antenna of the first BS that is to serve a third sector of the cell. In this manner, the preamble signals of the BSs of various operators in a cell are made orthogonal in frequency.

Figure 4B:
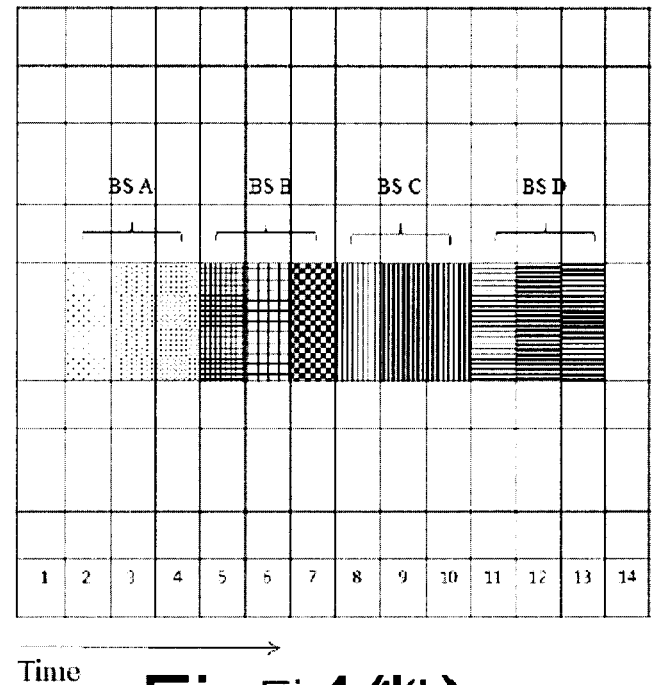
FIG. 4(b) illustrates a preamble planning in case of orthogonality in time for a three-sector configuration, in accordance with an implementation of the present subject matter.

In another example, the preamble signals may be orthogonal in time, as will be explained below:

FIG. 4(b) illustrates the preamble planning in case of orthogonality in time for a three-sector configuration, in accordance with an implementation of the present subject matter. As illustrated, different preambles from different sector/operators are transmitted in different block symbols.

Figure 4C:
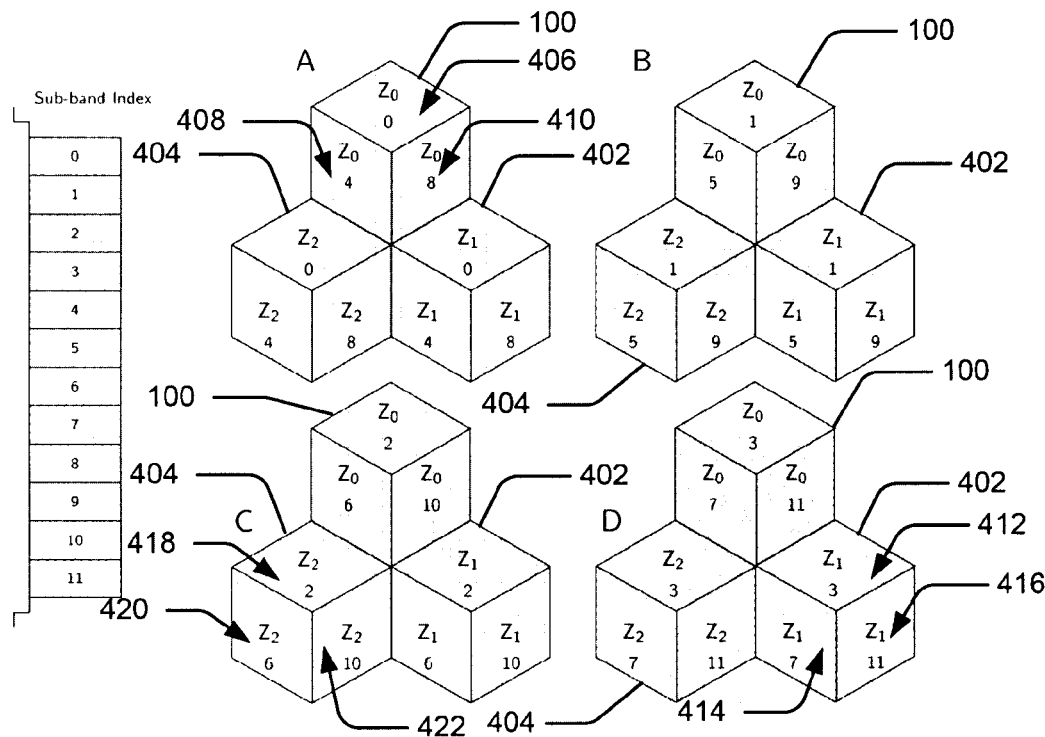
FIG. 4(c) illustrates preamble planning for a cluster of cells for four operators, in accordance with an implementation of present subject matter.

FIG. 4(c) illustrates preamble planning for a cluster of cells for four operators, in accordance with an implementation of present subject matter. The cluster of cells may include 3 neighbouring cells, i.e., cells which have overlapping boundaries with each other. Here, the preamble planning for the first cell 100 is performed by considering the preamble planning for a second cell 402 and a third cell 404, each of which has an overlapping boundary with the first cell 100. The first cell 100, the second cell 402, and the third cell 404 are shown four times to illustrate the preamble planning corresponding to each of the four operators.

Here, a three-sector configuration of the four BSs is considered. Accordingly, each cell is shown to be divided into three regions, also referred to as sectors. For instance, the first cell 100 includes a first region 406, a second region 408, and a third region 410. Similarly, the second cell 402 includes three regions 412-416, and the third cell includes three regions 418-422. Further, the BS of each operator may have three antennas, where each antenna services one region of the cell.

To facilitate preamble planning while considering neighbouring cells, the present subject matter makes the preamble signal transmitted by an antenna of a BS in a given cell distinguishable from other antennas of the BS, antennas of other BSs in the cell, and antennas in the neighbouring cells. To facilitate distinguishability, the present subject matter utilizes a plurality of preamble signals, in addition to providing orthogonality in frequency. In case of the three-sector configuration, three preamble signals may be utilized, which are referred to as Z0, Z1, and Z2. Each preamble signal is utilized by BSs in one of the three neighbouring cells, and not in the other two cells. For instance, Z0 is used by the BSs in the first cell 100, but not by those in the second cell 402 or the third cell 404. Similarly, Z1 is used in the second cell 402, and not in the first cell 100 or the third cell 404. Further, Z2 is used in the third cell 404, and not in the first cell 100 or the second cell 402.

Further, a given bandwidth may be divided into 12 sub-bands, which are numbered from 0-11 in FIG. 4(c). The bandwidth may be a portion of the shared spectrum and may be, for example, 18 MHz. The 12 sub-bands may be equally divided among the four operators. For instance, the sub-bands 4, and 8 may be assigned to the operator A, the sub-bands 1, 5, and 9 may be assigned to the operator B, the sub-bands 2, 6, and 10 may be assigned to the operator C, and the sub-bands 3, 7, and 11 may be assigned to the operator D.

The three sub-bands assigned to an operator may be equally divided among the three antennas of the BS of the operator. For instance, of the sub-bands assigned to the operator A, the $0^{th}$ sub-band may be assigned to a first antenna of the first BS 102-1 (which belongs to the operator A and which is in the first cell 100), the $4^{th}$ sub-band may be assigned to a second antenna of the first BS 102-1, and the $8^{th}$ sub-band may be assigned to a third antenna of the first BS 102-1. Therefore, the first BS 102-1 may send Z0 (which is assigned to the first cell 100) in the $0^{th}$ sub-band through the first antenna, in the $4^{th}$ sub-band through the second antenna, and in the $8^{th}$ sub-band through the third antenna. Thus, a combination of the preamble signal and sub-band transmitted through the first antenna, the second antenna, and the third antenna of the first BS 102-1 may be represented as (Z0, 0), (Z0, 4), and (Z0, 8) respectively.

Similarly, of the first, fifth, and ninth sub-bands assigned to the operator B, the first sub-band may be assigned to a first antenna of the second BS 102-2 (which belongs to the operator B and which is in the first cell 100), the fifth sub-band may be assigned to a second antenna of the second BS 102-2, and the ninth sub-band may be assigned to a third antenna of the second BS 102-2. Therefore, the second BS 102-2 may send Z0 in the $1^{st}$ sub-band through its first antenna, in the $5^{th}$ sub-band through its second antenna, and in the $9^{th}$ sub-band through its third antenna. Thus, a combination of the preamble signal and the sub-band transmitted through the first antenna, the second antenna, and the third antenna of the second BS 102-2 may be represented as (Z0, 1), (Z0, 5), and (Z0, 9) respectively.

As explained above, a combination of the preamble signal and a sub-band transmitted through an antenna is different from that transmitted through all other antennas in a given cell. Further, a combination of the preamble signal and a sub-band transmitted through an antenna may be different from that tram transmitted through antennas of BSs in neighbouring cells. For instance, a combination of the preamble signal and the sub-band transmitted by a BS of the operator A in the second cell 402 through its first antenna, second antenna, and third antenna may be (Z1, 0), (Z1, 4), and (Z1, 8) respectively. Such a combination is unique across all antennas in the cells 100, 402, and 404.

Figures 5A, 5B:
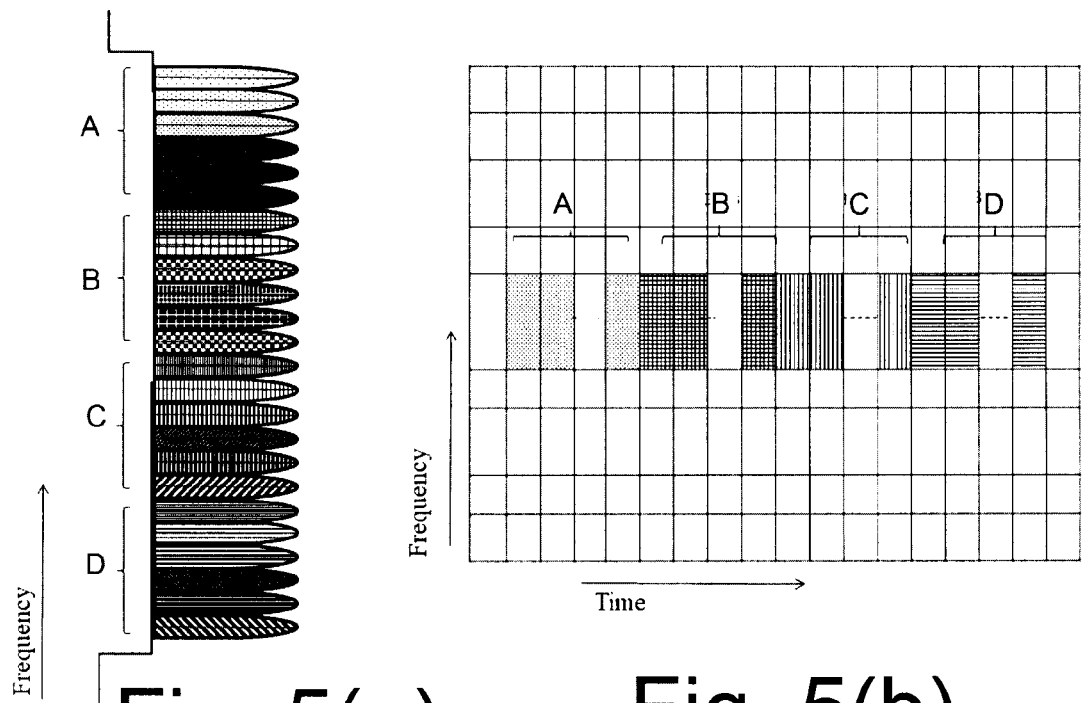
FIG. 5(a) illustrates preamble planning in case of orthogonality in frequency for four operators in a 12-sector configuration, in accordance with an implementation of present subject matter.
FIG. 5(b) illustrates preamble planning in a 12-sector configuration in case of orthogonality in time, in accordance with an implementation of present subject matter.

FIG. 5(a) illustrates preamble planning in case of orthogonality in frequency for four operators in a 12-sector configuration, in accordance with an implementation of present subject matter. As illustrated, a portion of the bandwidth of the spectrum is divided into 24 sub-bands. The 24 sub-bands are equally divided among the four operators. Accordingly, a first set of sub-bands (A) may be assigned to the first operator, a second set of sub-bands (B) may be assigned to the second operator, a third set of sub-bands (C) may be assigned to the third operator, and a fourth set of sub-bands (D) may be assigned to the fourth operator.

Here, the number of sub-bands per operator (6) may be lesser than the number of sectors (12) in a cell, as some of the sub-bands may be reused across the sectors, as will be explained with reference to FIG. 5(c).

FIG. 5(b) illustrates preamble planning in a 12-sector configuration in case of orthogonality in time, in accordance with an implementation of present subject matter. The different preambles from different sectors/operators are transmitted in predefined block symbols of a subframe. In this example, more than 14 preambles are used, which constitutes more than one subframe.

Figure 5C:
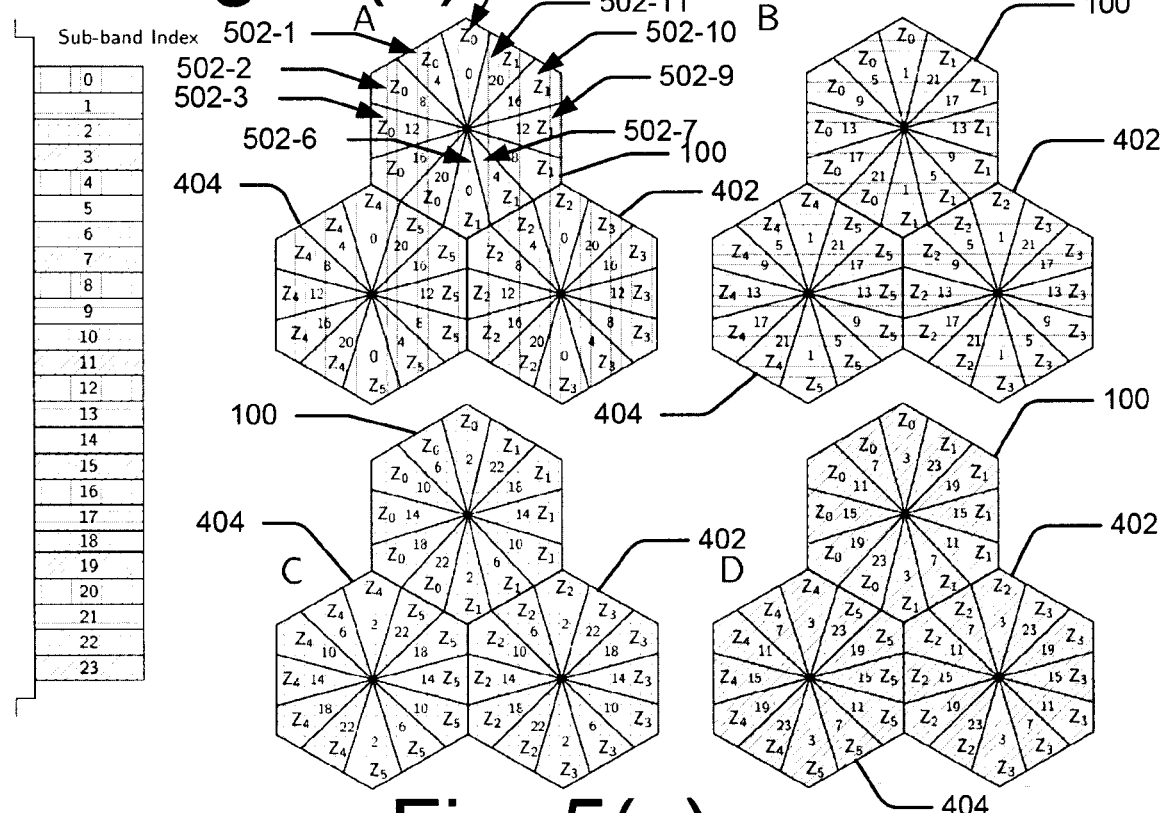
FIG. 5(c) illustrates preamble planning in a 12-sector configuration for a cluster of cells for four operators, in accordance with an implementation of present subject matter.

FIG. 5(c) illustrates preamble planning in a 12-sector configuration for a cluster of cells for four operators, in accordance with an implementation of present subject matter. Here, a 12-sector configuration of the four BSs is considered. Accordingly, each cell is shown to be divided into 12 regions, also referred to as sectors. The 12 regions of a cell may be broadly divided into two types: even-numbered regions and odd-numbered regions. Each even-numbered region may have an overlapping boundary with an odd-numbered region. Two even-numbered regions may be separated by an odd-numbered region and two odd-numbered regions may be separated by an even-numbered region. The even-numbered regions of the first cell 100 are 502-0, 502-2, . . . , 502-10 and the odd-numbered regions of the first cell 100 are 502-1, 502-3, . . . , 502-11. The even-numbered regions may be interchangeably referred to as a first set of regions and the odd-numbered regions may be interchangeably referred to as a second set of regions. Further, each even-numbered region may be referred to as a first region and each odd-numbered region may be referred to as a second region.

The BS of each operator may have 12 antennas, where each antenna services one region of the cell. For instance, each BS may have a first set of antennas to service the even-numbered regions and a second set of antennas to service the odd-numbered regions. For instance, the first set of antennas may be six in number, where each antenna services one region of the even-numbered regions. Similarly, the second set of antennas may be six in number, where each antenna services one region of the odd-numbered regions. Here, servicing of a region may refer to sending downlink signals to, and receiving uplink signals from a registered UE in the region. The servicing of a region may be performed by a BS through its antenna corresponding to that region.

To facilitate distinguishability of a preamble signal transmitted by an antenna of a BS in a given cell from other antennas of the BS, antennas of other BSs in the cell, and antennas in the neighbouring cells, the present subject matter utilizes a plurality of preamble signals, in addition to providing orthogonality in frequency. In case of the 12-sector configuration, six preamble signals may be utilized, which are referred to as Z0, Z1, Z2, Z3, Z4, and Z6. Two of the six preamble signals may be utilized by BSs in one of the three neighbouring cells, and not in the other two cells. For instance, Z0 and Z1 are used by the BSs in the first cell 100, but not by those in the second cell 402 or the third cell 404. Similarly, Z2 and Z3 are used in the second cell 402, and not in the first cell 100 or the third cell 404. Further, Z4 and Z5 is used in the third cell 404, and not in the first cell 100 or the second cell 402. Further, each of the two preamble signals assigned to a cell may be used in six regions of the cell. For instance, Z0 may be used in the regions 502-0-502-5 of the first cell 100 and Z1 may be used in the regions 502-6-502-11.

Further, a given bandwidth may be divided into 24 sub-bands, which are numbered from 0-23 in FIG. 5(c). The bandwidth may be the entire spectrum that is shared by the four operators and may be, for example, 40 MHz. The 24 sub-bands may be equally divided among the four operators. For instance, the sub-bands 0, 4, 8, 12, 16, and 20 may be assigned to the operator A, the sub-bands 1, 5, 9, 13, 17, and 21 may be assigned to the operator B, the sub-bands 2, 6, 10, 14, 18, and 22 may be assigned to the operator C, and the sub-bands 3, 7, 11, 15, 19, and 23 may be assigned to the operator D.

A sub-band assigned to an operator may be assigned to two antennas of a BS of the operator in a cell. For instance, the $0^{th}$ sub-band may be assigned to an antenna of the first BS 102-1 that services the region 502-0 and region 502-6, the $4^{th}$ sub-band may be assigned to an antenna of the first BS 102-1 that services the region 502-1 and 502-7, and so on. Therefore, the first BS 102-1 may send Z0 in the $0^{th}$ sub-band through the antenna servicing the region 502-0 and Z1 in the $0^{th}$ sub-band through the antenna servicing the region 502-6. Further, the first BS 102-1 may send Z0 in the $4^{th}$ sub-band through the antenna servicing the region 502-1 and Z1 in the $4^{th}$ sub-band through the antenna servicing the region 502-7. Thus, the combination of the preamble signals and the sub-bands transmitted through the antennas of the first BS 102-1 servicing the $0^{th}$-$11^{th}$ regions may be represented as (Z0, 0), (Z0, 4), (Z0, 8), (Z0, 12), (Z0, 16), (Z0, 20), (Z1, 0), (Z1, 4), (Z1, 8), (Z1, 12), (Z1, 16), and (Z1, 20) respectively.

Similarly, the preamble signals transmitted by the antennas of the second BS 102-2 servicing the $0^{th}$-$11^{th}$ regions may be represented as (Z0, 1), (Z0, 5), (Z0, 9), (Z0, 13), (Z0, 17), (Z0, 21), (Z1, 1), (Z1, 5), (Z1, 9), (Z1, 13), (Z1, 17), and (Z1, 21) respectively.

In the above-explained manner, a combination of the preamble signal and a sub-band transmitted by an antenna in a cell may be different than that transmitted by other antennas in the cell and that transmitted by other antennas in neighbouring cells.

As explained in the above examples, using orthogonality in frequency or in time, or using a combination of orthogonal sub-bands and preamble signals, a UE can identify the various BSs and various sector antennas from which it receives the preamble signal. This will be further used by the UE in estimating the number of dominant interferers. For instance, based on the preambles received from various BSs, the UE may identify the BS and the sector antenna from which it receives signals of highest strength. Such identification may be used by the UE for connecting to the BS that provides the strongest signal, for being served by that BS, as will be explained in the below paragraphs. In an example, the preamble signal may be transmitted in every fifth subframe in the first block symbol.

Figure 6:
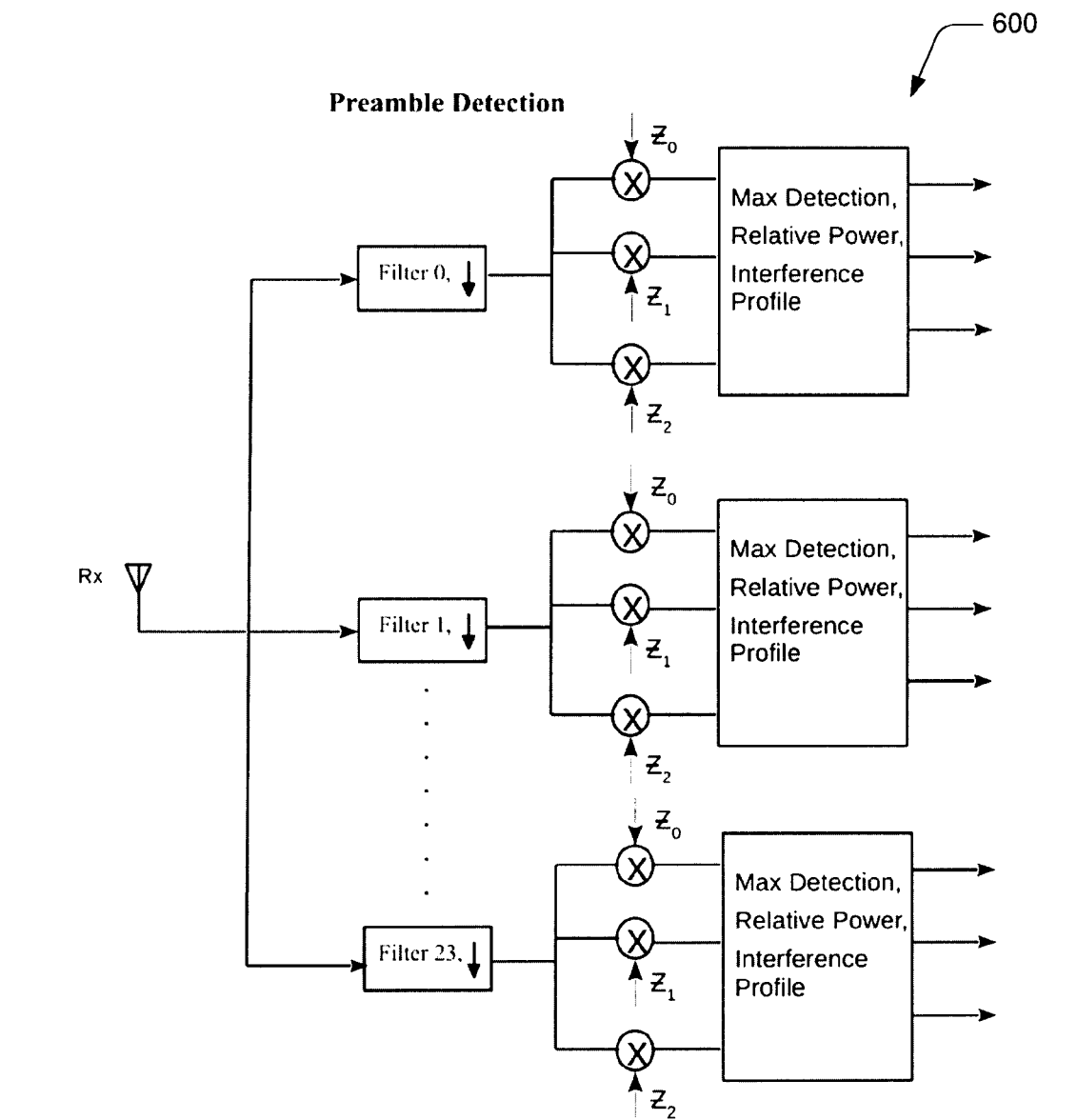
FIG. 6 illustrates a UE, in accordance with an implementation of the present subject matter.

FIG. 6 illustrates a UE 600 that can connect to the strongest BS regardless of the operator, in accordance with an implementation of the present subject matter. The UE 600 may be, for example, the UE 104, the UE 106, the UE 108, or the UE 110. The UE 600 may include a processor and a memory. The memory of the UE 600 may have instructions stored thereon, which can be executed by the processor for performing the functions of the UE 600 described herein.

When the UE 600 powers on, the UE 600 searches for the preamble signal from a BS of its parent operator. As mentioned earlier, the parent operator for the UE 600 may be the operator that issued the SIM card being used in the UE 600. The preamble signal to be received from the parent operator may have a frequency in the frequency spectrum, which is shared between multiple operators. For instance, the UE 600 searches for a preamble signal in sub-bands in which preamble signals of its parent operator are to be transmitted. As explained earlier, in case of 12-sector configuration, each operator is assigned with six sub-bands and six different preamble signals. Of these, the UE 600 may detect three different preamble signals in each sub-band assigned to its parent operator. The preamble signals detected by the UE 600 may depend upon its location. In this process, the UE 600 detects one or more than one BS of the parent operator. The UE 600 determines the received power or SINR of the preamble signal from each antenna of each BS. Subsequently, the UE 600 determines the BS and the antenna of the BS from which it is likely to receive the strongest signal based on received power or SINR of the preamble signals. Such a BS may be selected by the UE 600 for connection. If the UE 600 does not detect any preamble from BS of its parent operator, the UE 600 searches for preamble signals in all sub-bands and detects strongest sector antenna of strongest BS based on the received power, as illustrated in FIG. 6. The strongest antenna may refer to the antenna through which the UE 600 is likely to receive the strongest signals. In the below paragraph, the scenario of the UE 600 selecting a BS of the parent operator is explained. Further, the parent operator of the UE 600 is explained as operator A, and the BS selected by the UE 600 is explained as the first BS 102-1.

Upon selecting the first BS 102-1, the UE 600 requests the BS for registration with the operator A. The registration may involve an authentication of the UE 600 by the first BS 102-1. This authentication function is known as AKA (Authentication and Key Agreement), as will be understood by a person skilled in the art. Based on the authentication, the UE 600 may register with the first BS 102-1. The successful registration with the first BS 102-1 enables a connection between the UE 600 and the first BS 102-1. Thereafter, the UE 600 may receive downlink signals and send uplink signals through the first BS 102-1. In other words, the first BS 102-1 becomes the serving BS of the UE 600. As will be understood, toe communication between the first BS 102-1 and the UE 600 happens in the frequency spectrum. In an example, subsequent to the connection with the first BS 102-1, to be served by the first BS 102-1, the UE 600 performs a ranging operation, as will be understood by a person skilled in the art.

Since the parent operator of the UE 600 operates in a spectrum that is shared by multiple operators, the UE 600 can detect the preamble signals from the BSs of the other operators, such as the second BS 102-2, the third BS 102-3, upon connection with the first BS 102-1. This is because the sub-bands of the preamble signals of the other operators are in the shared spectrum, for which the SIM card of UE 600 is configured. It is to be noted that, since the spectrum is being shared by the first operator and the second operator, the RF (Radio Frequency) Front-End of the UE 600 is not to be re-tuned for detecting the preamble signal from the second BS 102-2 or to be served by the second BS 102-2.

Therefore, upon connection with the first BS 102-1, the UE 600 may monitor the preamble signals from BSs of all operators that share the spectrum and identifies the BS from which it is likely to receive signals with the highest strength based on the received power/SINR of the preamble signals from the various BSs. The identified BS may be the second BS 102-2. For instance, based on the preamble signal sent by the second BS 102-2, the UE 600 may determine that the preamble signal from the second BS 102-2 has the highest strength as compared to preamble signals from the other BSs of other operators. Therefore, the UE 600 determines that the downlink signals to be received from the second BS 102-2 is to have a higher strength than that from the first BS 102-1.

The UE 600 may then indicate to the first BS 102-1 that the second BS 102-2 is likely to provide signals of higher strength to the UE 600 and may request the permission of the first BS 102-1 to be served by the second BS 102-2. Based on the request, the first BS 102-1 may request the second BS 102-2 to service the UE 600. If, based on its network load, the second BS 102-2 determines that it can serve the UE 600, the first BS 102-1 permits the UE 600 to be served by the second BS 102-2. Thereafter, the UE 600 connects with the second BS 102-2. Subsequently, the second BS 102-2 may act as the serving BS for the UE 600 may send downlink signals to and receive uplink signals from the UE 600. As will be understood, such a communication is in the frequency spectrum. The procedure for transfer of the responsibility to serve the UE 600 from the first BS 102-1 to the second BS 102-2 may be achieved using a simple hand-off by the first BS 102-1.

Figure 7A:
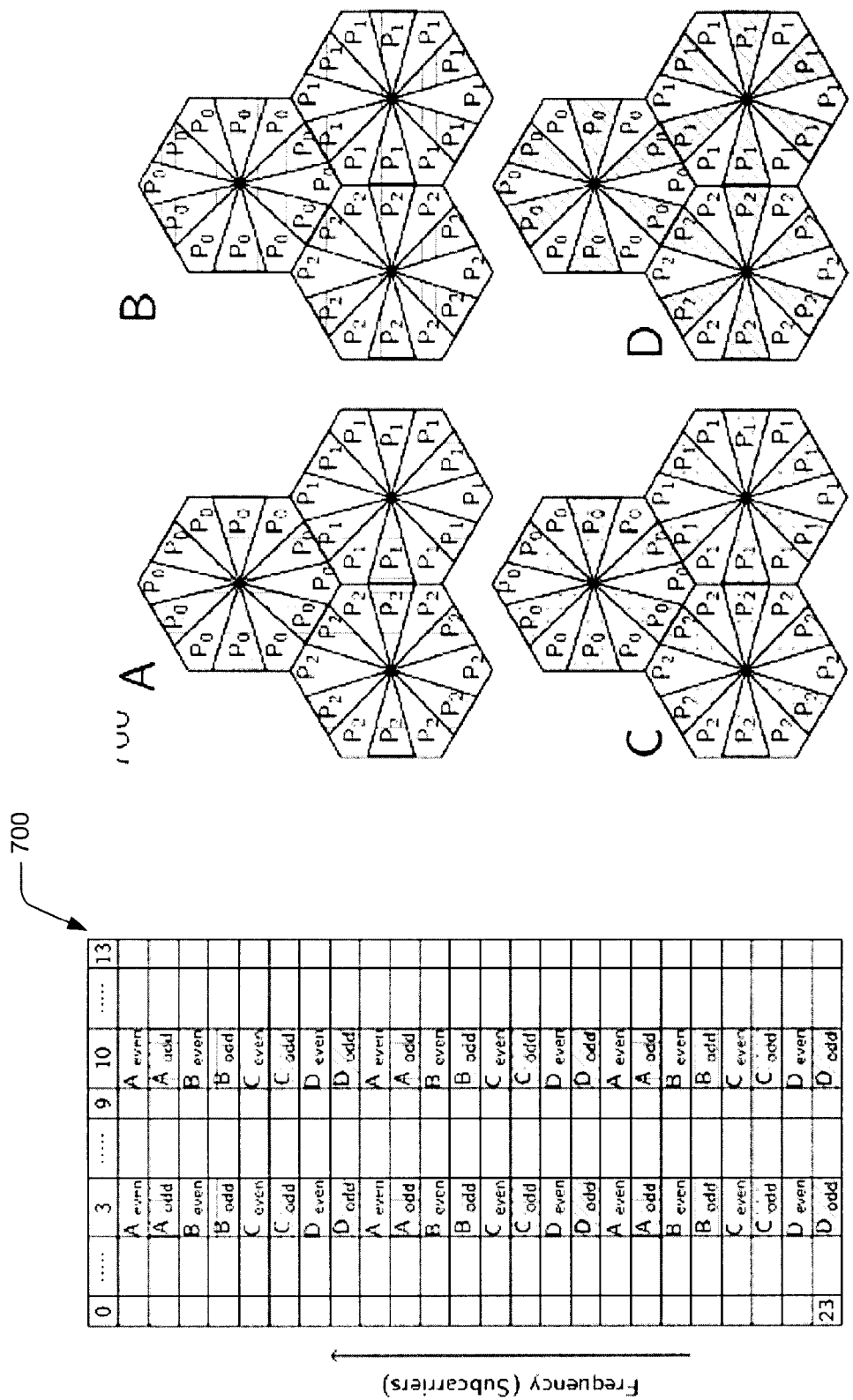
FIG. 7(a) illustrates downlink pilot planning for BSs of four operators in a 12-sector configuration, in accordance with an implementation of present subject matter.

FIG. 7(*a*) illustrates downlink pilot planning for BSs of four operators in a 12-sector configuration, in accordance with an implementation of present subject matter.

Generally, a UE may not be aware of what is being transmitted by a particular BS. A pilot signal is a signal known both to the BS and the UE. Accordingly, a pilot signal is used to estimate a channel response of a channel between the BS and the UE. The utilization of the pilot signal to estimate the channel response is explained using the below signal model:

$$Y = H*X + N$$

where X is the transmitted signal, H is the channel response, Y is the received signal, and N is the noise.

To estimate the channel response H, a known pilot signal is transmitted signal as X by the BS. Accordingly, by processing the received signal along with the copy of the transmitted pilot signal known to the UE, the value of H is determined by the UE.

In accordance with the present subject matter, the pilot signals sent through the different antennas of the different BSs may be unique, to facilitate accurate estimation of the channel coefficients corresponding to the serving BS as well as the other BSs whose signals cause significant interference at the UE (also referred to as "interference BS"). The manner in which the pilot signals of the different BSs are configured is referred to as pilot planning.

The pilot planning depends on the number of operators sharing the spectrum. The pilot planning according to the present subject matter allows a UE to estimate the channel seen from the serving BS and the interference BSs accurately. For example, even when a UE moves by a few centimetres, the UE may see a different channel. Accordingly, the pilot signals are employed to continuously monitor the channels with respect to the movement of a UE in a network. Further, the pilot signals are orthogonal in frequency and no data will be transmitted in that resource element thereby enabling the channel estimation. The preamble signal and pilot signals are orthogonal across the operators and sectors.

The pilot planning according to the present subject matter involves utilizing different pilot signals. The number of the pilot signals utilized may be three, and may be equally divided among the three neighbouring cells, i.e., the first cell 100, the second cell 402, and the third cell 404. The three pilot signals may be referred to as a first pilot signal (P0), a second pilot signal (P1), and a third pilot signal (P2). The first pilot signal may be utilized in the first cell 100, the second pilot signal may be utilized in the second cell 402, and the third pilot signal may be utilized in the third cell 404. Accordingly, the BSs in the first cell 100, such as the first BS 102-1, the second BS 102-2, the third BS 102-3, and the fourth BS 102-4, may send P0 through their antennas. Similarly, the BSs in the second cell 402 may send P1 and the BSs in the third cell 404 may send P2. Each pilot signal assigned to a cell may be used in all regions of the cell.

The pilot signals may be sent in two of the 14 symbols of a physical resource block (PRB) 700. The two symbols may be the third symbol and the tenth symbol, as illustrated. As will be understood, a PRB may refer to a collection of 24 continuous sub-carriers across frequency and 14 continuous block symbols in time. A grid formed by one symbol and one sub-carrier may be referred to as a resource element (RE). Accordingly, the 24 REs available in the third symbol and the 24 REs available in the tenth symbol are utilized for transmitting the pilot signal by the BSs. A pilot signal may be sent by a BS in a plurality of REs of the PRB 700, as will be explained below.

The 24 sub-carriers in a PRB may be equally divided among the four operators that share the spectrum. For instance, the operator A may be assigned with the $0^{th}$, $1^{st}$, $8^{th}$, $9^{th}$, $16^{th}$, and $17^{th}$ sub-carriers, the operator B may be assigned with the $2^{nd}$, $3^{rd}$, $10^{th}$, $11^{th}$, $18^{th}$, and $19^{th}$ sub-carriers, the operator C may be assigned with the $4^{th}$, $5^{th}$, $12^{th}$, $13^{th}$, $20^{th}$, and $21^{st}$ sub-carriers, and the operator D may be assigned with the $6^{th}$, $7^{th}$, $14^{th}$, $15^{th}$, $22^{nd}$, and $23^{rd}$ sub-carriers.

The six sub-carriers assigned to an operator may be equally divided among the even-numbered and odd-numbered regions of a cell. Further, all the six sub-carriers are used in all the three neighbouring cells. For instance, the $0^{th}$, $8^{th}$ and $16^{th}$ subcarriers are assigned to even-numbered regions of operator A and the $1^{st}$, $9^{th}$ and $17^{th}$ sub-carriers are assigned to odd-numbered regions of operator A. The sub-carriers assigned to the even-numbered regions of the first operator (in this case, $0^{th}$, $8^{th}$ and $16^{th}$ sub-carriers) may be referred to as a first set of sub-carriers and the sub-carriers assigned to the odd-numbered regions of the first operator (in this case, $1^{st}$, $9^{th}$ and $17^{th}$ sub-carriers) may be referred to as a second set of sub-carriers. Similarly, the $2^{nd}$, $10^{th}$, and $18^{th}$ subcarriers are assigned to even-numbered regions of operator B and the $3^{rd}$, $11^{th}$, and $19^{th}$ subcarriers are assigned to odd-numbered region of operator B. The sub-carriers assigned to the even-numbered regions of the second operator may be referred to as a third set of sub-carriers and the sub-carriers assigned to the odd-numbered regions of the second operator may be referred to as a fourth set of sub-carriers.

Each set of sub-carriers assigned to an operator may be used in six regions of a cell. Further, two adjacent regions do not use the same set of sub-carriers. For instance, as explained above, the $0^{th}$, $8^{th}$, and $16^{th}$ sub-carriers may be utilized in the even-numbered regions 502-0, 502-2, ..., 502-10, and the $1^{st}$, $9^{th}$, and $17^{th}$ sub-carriers may be utilized in the odd-numbered regions 502-1, 502-3, ..., 502-11.

The assigned pilot signal and the sub-carriers may be utilized by a BS for transmitting pilot signals through antennas servicing various regions of a cell. For instance, as explained above, the pilot signal to be used by the first BS 102-1 (belonging to operator A and in the first cell 100) is P0 and the sub-carriers to be used for servicing the even-numbered regions are $0^{th}$, $8^{th}$ and $16^{th}$. Accordingly, the first BS 102-1 may transmit P0 in the $0^{th}$, $8^{th}$, and $16^{th}$ REs (corresponding to the $0^{th}$, $8^{th}$, and $16^{th}$ sub-carrier) through the first set of antennas (which service the first set of regions) in the third symbol of the PRB 700 and in the tenth symbol of the PRB 700. Accordingly, the BS of the first operator in the second cell 402 may transmit P1 in the $0^{th}$, $8^{th}$, and $16^{th}$ REs through the first set of antennas in the third symbol of the PRB 700 and in the tenth symbol of the PRB 700. The set of REs in which pilot signals are transmitted by the first set of antennas of BSs of the first operator is referred to as a first set of REs.

Similarly, the first BS 102-1 may transmit P0 in the $1^{st}$, $9^{th}$, and $17^{th}$ REs through the second set of antennas (servicing the odd-numbered regions) in the third and tenth symbols of the PRB 700. Similarly, the BS of the first operator in the second cell 402 may transmit P1 in the $1^{st}$, $9^{th}$, and $17^{th}$ REs through the second set of antennas in the third and tenth symbols of the PRB 700. The set of REs in which pilot signals are transmitted by the second set of antennas of BSs of the first operator is referred to as a second set of REs.

Further, the second BS 102-2 may transmit P0 in the $2^{nd}$, $10^{th}$, and $18^{th}$ REs through its first set of antennas in the third and tenth symbols of the PRB 700. Similarly, the BS of the second operator in the second cell 402 may transmit P1 in the $2^{nd}$, $10^{th}$, and $18^{th}$ REs through its first set of antennas in the third and tenth symbols of the PRB 700. The set of REs in which pilot signals are transmitted by the first set of antennas of BSs of the second operator is referred to as a third set of REs.

Further, the second BS 102-2 may transmit P0 in the $3^{rd}$, $11^{th}$, and $19^{th}$ REs through its second set of antennas in the third and tenth symbols of the PRB 700. Similarly, the BS of the second operator in the second cell 402 may transmit P1 in the $3^{rd}$, $11^{th}$, and $19^{th}$ REs through its second set of antennas in the third and tenth symbols of the PRB 700. The set of REs in which pilot signals are transmitted by the second set of antennas of BSs of the second operator is referred to as a fourth set of REs.

In this manner, the pilot signals transmitted from an antenna of a BS in a cell is made distinguishable from the pilot signals transmitted from other antennas of the BS, antennas of the other BSs in the cell, and antennas of the BSs in other neighbouring cells.

In the present subject matter, the pilot density, i.e., the number of pilot signals per PRB along the frequency domain is higher as compared to a conventional scenario in which each operator used an orthogonal spectrum. Further, in the present subject matter, a Joint Maximum Likelihood (JML) Receiver process is utilized for decoding the required signal stream, without decoding the other stream of signal which are being transmitted by different operators/sectors in a given region. In the JML receiver process, the received super constellation is exploited along with individual channel response to decode the wanted data stream, without decoding the interfering data streams, by a UE. Suppose, a UE is experiencing interference from one BS, then the received signal may be written as below:

$$Y = H0*X0 + H1*X1 + N$$

Where, H0 and X0 are the channel and data stream respectively from the connected BS, while H1 and X1 are the channel and data stream respectively from the interfering BS. Through joint channel estimation process, H0 and H1 are estimated and approximate value of N will be estimated by the UE. Then, depending on the modulation carried by both X0 and X1, various combinations of symbols are analysed, and its probability of occurrence is estimated by the UE. Based on these values, the symbol that has the highest probability is selected as estimated symbol and then it is used for decoding the data stream. If both X0 and X1 are QPSK constellation, there are only 16 combinations and if X0 is 16 QAM and X1 is QPSK, then there are 64 combination of symbols need to be analysed.

The pilot planning of the present subject matter includes both non-orthogonal and orthogonal pilot design. This allows the channel estimation process to be simple in terms of signal processing. The channel estimator uses Joint Modified Least Squares (JMLS) principle, where, depending on the number of interferers (which is conveyed through indicator pilot control signal) signal, all the channels are estimated within a given accuracy.

Figure 7B:
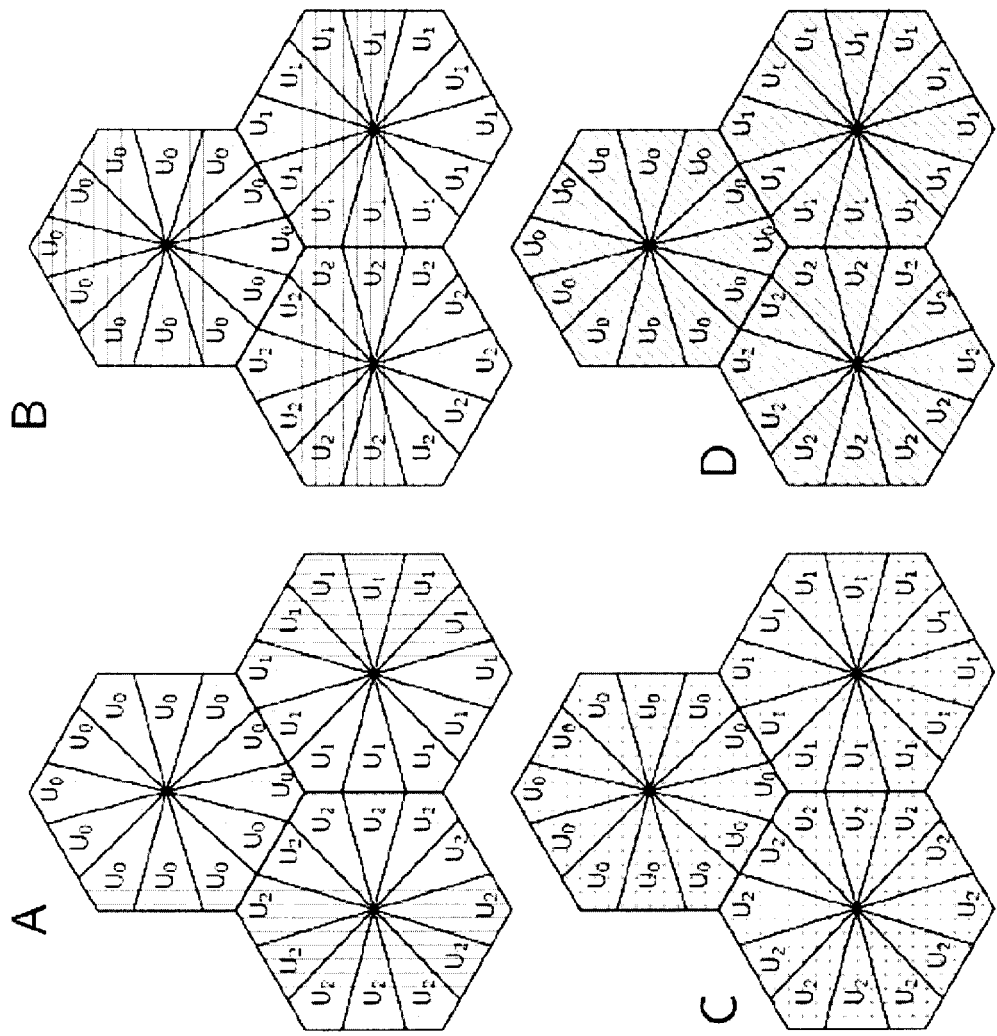
FIG. 7(b) illustrates uplink pilot planning for BSs of four operators in a 12-sector configuration, in accordance with an implementation of present subject matter.

FIG. 7(b) illustrates uplink pilot planning for BSs of four operators in a 12-sector configuration, in accordance with an implementation of present subject matter. The uplink pilot signals are similar to downlink pilot signals with the difference that the uplink pilot density is higher than downlink pilot density. The downlink pilots are wideband in nature. In other words, in downlink, regardless of whether any UE is being served in a particular sub-band or not, the pilot sub-carriers will be loaded. However, in the uplink, the pilot signals are localized in nature. In other words, pilot sub-carriers are loaded only when there is an uplink transmission. The uplink pilot planning of the present subject matter includes both non-orthogonal and orthogonal pilot design.

When a spectrum is shared simultaneously among different operators, frequency planning is important. In the present subject matter Frequency planning is carried out in two different ways, such as Advanced Fractional Frequency Reuse (AFFR) and Fractional Frequency Reuse (FFR), but it is not limited with these two methods. FFR is a process where sub-band level or even sub-carrier re-use planning can be done across the entire network. Frequency planning is important as the same spectrum is simultaneously shared among the different operators. Depending on the number of sectors in the given configuration (e.g., three-sector or twelve-sector), the sub-bands are enabled across the sectors will differ based on parameters like interference management and interference alignment. The frequency planning is explained later.

Figure 8:
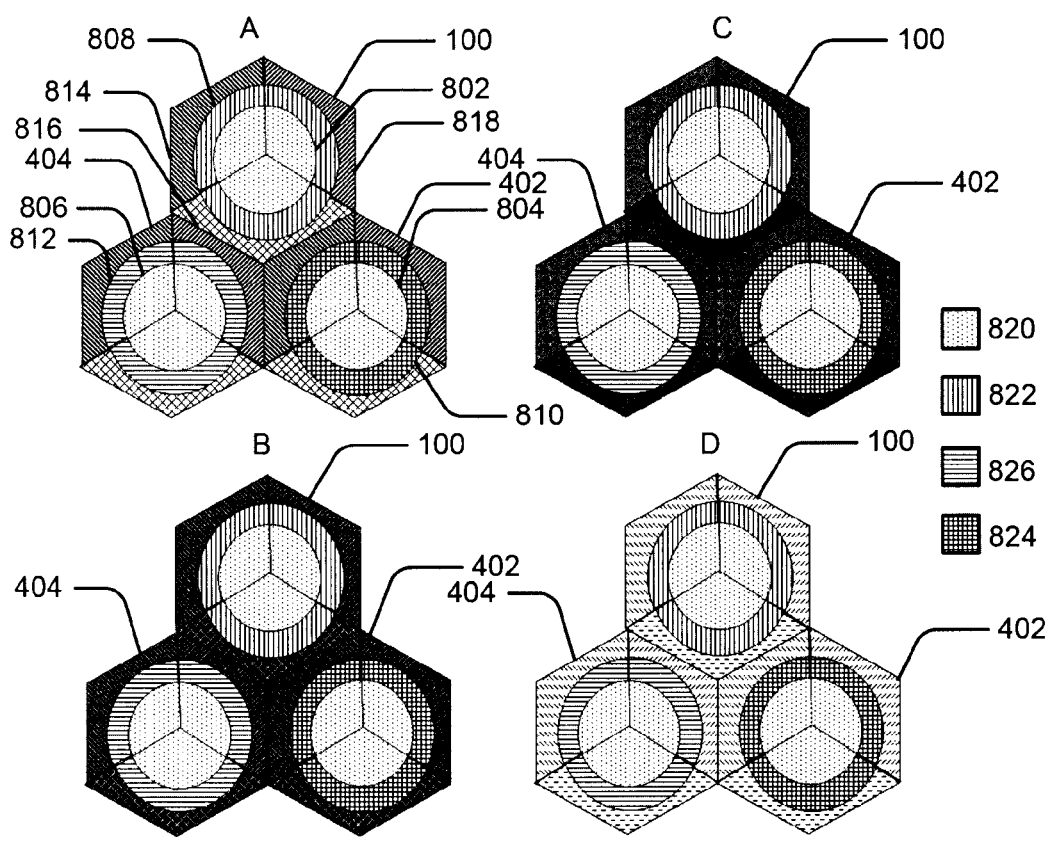
FIG. 8 illustrates frequency planning in a three-sector model, in accordance with an implementation of the present subject matter.

FIG. 8 illustrates the frequency planning in a three-sector model, in accordance with an implementation of the present subject matter. Frequency planning is a process where different sub-bands are enabled in different sector to enable the spectrum sharing network. Frequency planning is important, as the same spectrum is simultaneously shared among the four different operators.

For the spectrum utilization, different types of radiation patterns can be used. Further, the different radiation patterns can co-exist. In an example, some of the BSs may use an omni radiation pattern, while other BSs may use either a three-sector radiation pattern or a multi-sector radiation pattern. Frequency planning for the network is decided based on the radiation pattern which enables interference avoidance. In an example, the frequency reuse plan in the network may be a combination of conventional FFR, and an AFFR scheme.

The shared spectrum is partitioned with different reuse factors to effectively manage the interference caused by spectrum sharing. The sub-bands from different partitions are enabled in different sectors such that the throughput across the UEs are similar irrespective of their location (i.e. user at center of a cell or user at an edge of a cell).

For the purposes of frequency planning, each cell may be divided into two regions: an interior region and an exterior region. The interior region may be a predetermined area surrounding a centre of the cell and the remainder of the region may be the exterior region. The interior region may be circular in shape. The interior region of the first cell 100 may be the first interior region 802, the interior region of the second cell 402 may be the second interior region 804, and the interior region of the third cell 404 may be the third interior region 806. The area of a cell outside of its interior region is the exterior region. In an example, the area outside of the interior region may be divided into a first exterior region and a second exterior region, where the first exterior region may be the area immediately outside of the interior region and the second exterior region may be the area of the cell excluding the interior region and the first exterior region. The first exterior region may be ring-shaped. The first exterior regions of the first cell 100, the second cell 402, and the third cell 404 are numbered 808, 810, and 812 respectively. The second exterior region may be further divided into three sub-regions, where each sub-region subtends an angle of 120° at the centre of the cell. The three sub-regions of the first cell 100 are numbered 814, 816, and 818.

For the three-sector configuration, a first band of frequency 820, also referred to as the first band 820, will be reused in the interior regions of all cells by all of the operators A, B, C, and D. The first band 820 is a part of the frequency spectrum shared between the operators. In other words, the first BS 102-1, the second BS 102-2, the third BS 102-3, and the fourth BS 102-4 may use the first band 820 for sending downlink signals to UEs in the interior region 802.

The interior regions may or may not be seeing significant interference from the BSs in neighbouring cells. Accordingly, depending upon the interference power, it may or may not be included in the interference modelling. However, it will receive interference from intra-cell BS, which are appropriately modelled for, when decoding the desired signal. The number of interference signals which are modelled depends on the relative power with respect to the desired signal. Only dominant interferers are modelled, while the remaining are treated as Rest of interference (ROI). A BS may be considered to be a dominant interferer if the strength of the received signal is within a predetermined range, such as +/−3 dB, from the wanted signal strength, i.e., the strength of the signal received from the serving BS.

The frequency band to be utilized for communicating with UEs in the first exterior region may vary across the neighbouring cells. For instance, a second band 822 may be utilized in the first cell 100, a third band 824 may be utilized in the second cell 402, and a fourth band 826 may be utilized in the third cell 404. The BSs of all operators in a cell may utilize a given frequency band for communicating with UEs in the first exterior region of the cell. Accordingly, each of the second band 822, the third band 824, and the fourth band 826 may be used in one-third of the cells. For instance, the first BS 102-1, the second BS 102-2, the third BS 102-3, and the fourth BS 102-4 may use the second band 822 for sending downlink signals to UEs in the first exterior region 808, while BSs in the second cell 402 may utilize the third band 824 for sending downlink signals to the UEs in the first exterior region 810 of the second cell 402. Similarly, the BSs of the operators A, B, C, and D in the third cell 404 may utilize the fourth band 826 for sending downlink signals to the UEs in the first exterior region 812 of the third cell 404. Such a configuration may be referred to as FR3. Using the FR3 configuration, it can be ensured that a UE in a first exterior region of a cell does not get affected by a BS in another cell.

UEs in the first exterior regions will have moderate SINR, as they are away from the centre of the cell. Therefore, to have a good SINR, they are served with FR3 spectrum, which does not have any interference from neighbouring cells. These UEs will see dominant interference from within the cell and interference from adjacent cells are generally weak as compared to the desired signal power. Hence, only the intra-cell interference is modelled for the UEs in FR3 spectrum.

The third group UEs (UEs in the sub-regions of the cells) have poor SINR and therefore are served with orthogonal spectrum, which does not have any interference from intra-cell and may have weak interference from the adjacent cell.

Figure 9:
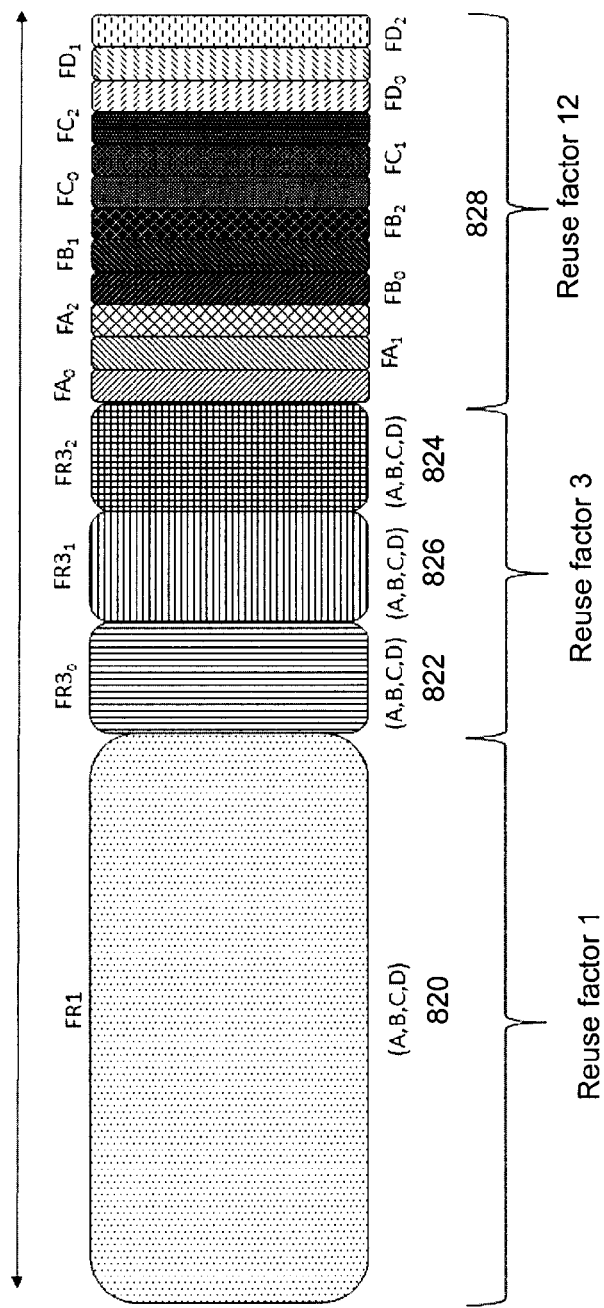
FIG. 9 illustrates Advanced Fractional Frequency Reuse (AFFR) spectrum partitioning for four operators, in accordance with an implementation of the present subject matter.

FIG. 9 illustrates Advanced Fractional Frequency Reuse (AFFR) spectrum partitioning for four operators, in accordance with an implementation of the present subject matter. FIG. 9 is an alternate way of representing the frequency planning shown in FIG. 8.

For obtaining more throughput, the entire spectrum to be shared among the different operators are segmented into different portions. For instance, the shared spectrum is partitioned into two parts, where the first part of the spectrum is reused in all the cells, while the other part is shared amongst a cluster of cells or partitioned further and used by different operators. The orthogonal part of the spectrum is used by the network as requirement demands to enable a higher minimum throughput across the users. 820 represents the segment of the given spectrum which will be used across the network in the interior regions of all the cells, i.e., with a frequency reuse factor of 1. This segment of the spectrum will be assigned for UEs with higher SINR (Signal-to-Interference-plus-Noise Ratio), while the segments of spectrum labelled 822, 824, and 826 are used across the network with a reuse factor of three. This segment is used for UEs with moderate wideband SINR, where, because of the lower reuse factor, the interference is avoided, which allows the SINR to be higher compared to the wideband SINR. 828 is indicative of various patterns used in the sub-regions of the cells where an orthogonal frequency partition is allotted.

Figure 10B:
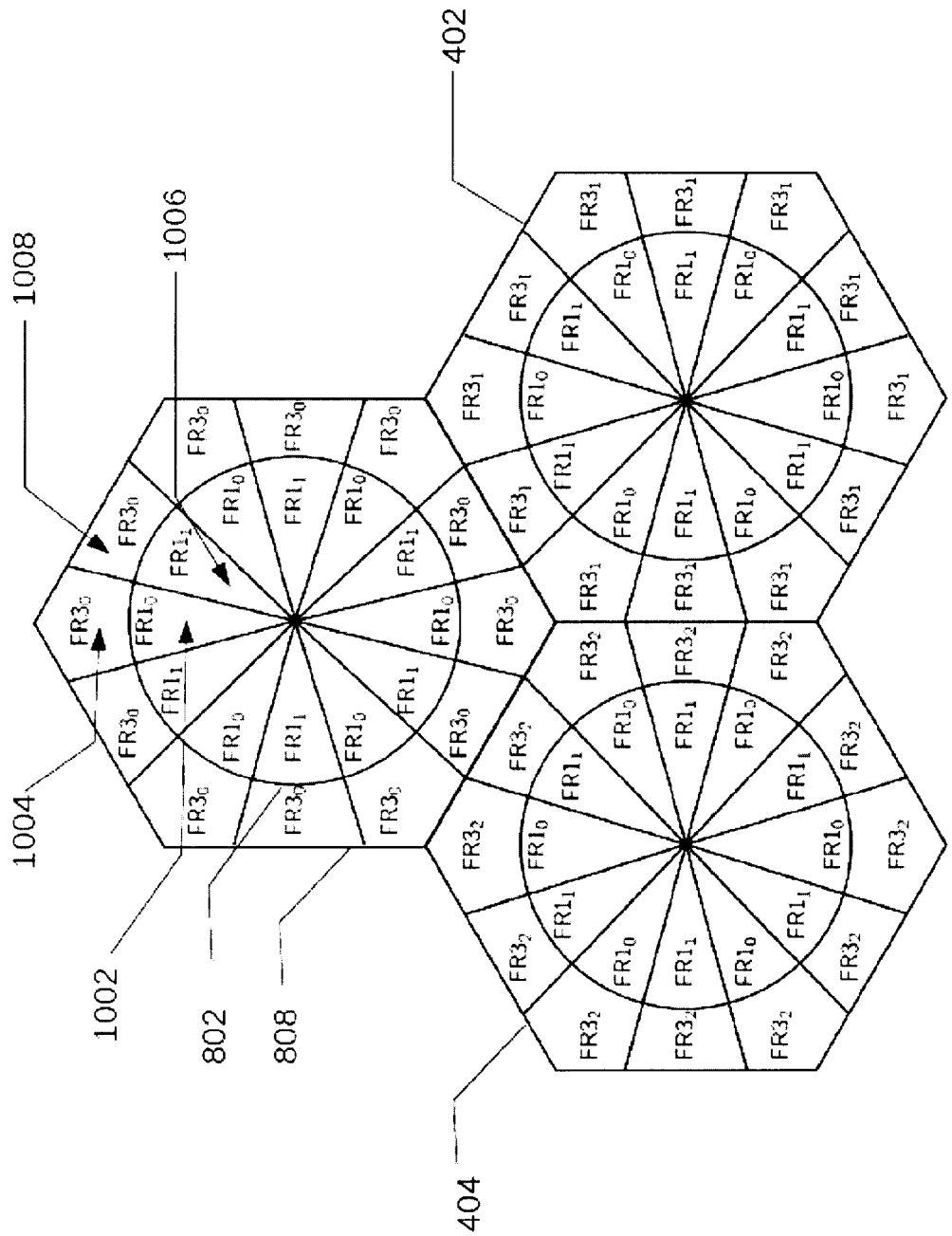
FIG. 10(b) illustrates the utilization of frequency bands of shared spectrum in different regions of different cells, in accordance with an implementation of the present subject matter.

FIGS. 10(a) and 10(b) illustrate frequency planning in case of 12-sector configuration, in accordance with an implementation of the present subject matter.

FIG. 10(a) illustrates Fractional Frequency Reuse (FFR) spectrum partitioning for four operators, in accordance with an implementation of the present subject matter. As illustrated, the spectrum may be divided into five bands, where two bands to be used in the interior regions of the cells and remaining three bands are to be used in the first exterior regions of the cells. The five bands are named as $FR3_0$, $FR1_0$, $FR3_1$, $FR1_1$, and $FR3_2$. Here, the bands $FR1_0$ and $FR1_1$ are to be used in the interior regions of all cells and may have an equal bandwidth. Further, each of the $FR3_0$, $FR3_1$, and $FR3_2$ bands may be used in the first exterior regions of one-third of the cells. The bands $FR3_0$, $FR3_1$, and $FR3_2$ may have equal bandwidth, which is lesser than the bandwidth of the bands $FR1_0$ and $FR1_1$.

FIG. 10(b) illustrates the utilization of the frequency bands of the shared spectrum in different regions of different cells, in accordance with an implementation of the present subject matter. Here, each cell is divided into an interior region and a first exterior region. The interior region of the first cell 100 is numbered 802 and the first exterior region of the first cell 100 is numbered 808. As illustrated, sub-regions near edges of the cells are not considered herein for the frequency planning. However, it will be understood that the frequency planning may be performed while considering the sub-regions as well.

Further, each cell may be divided into a six even-numbered regions and six odd-numbered regions, as explained earlier. Each even numbered-region may include a part of the interior region of the cell and a part of the first exterior region of the cell. Similarly, each odd numbered-region may include a part of the interior region of the cell and a part of the first exterior region of the cell. The part of the interior region of cell and the part of the first exterior region of the cell within the even-numbered region may be referred to as a first part of the interior region and a first part of the first exterior region respectively. Further, the part of the interior region of cell and the part of the first exterior region of the cell within the odd-numbered region may be referred to as a second part of the interior region and a second part of the first exterior region respectively. The various parts of the cell are explained with the help of the region 502-0 (which is an even-numbered) and the region 502-1 (which is an odd-numbered region). The first part of the interior region 802 within the region 502-0 is numbered 1002 and the first part of the first exterior region 808 within the region 502-0 is numbered 1004. The second part of the interior region 802 within the region 502-1 is numbered 1006 and the second part of the first exterior region 808 within the region 502-1 is numbered 1008.

The interior regions of all cells may use the bands $FR1_0$ and $FR1_1$. The $FR1_0$ band and the $FR1_1$ band may be used in alternate interior regions. For instance, the $FR1_0$ band may be utilized in the first parts of the interior region and the $FR1_1$ band may be utilized in the second parts of the interior region, as illustrated. The $FR1_0$ band may be referred to as a first band of the spectrum and the $FR1_1$ band may be referred to as a third band of the spectrum. Accordingly, the first BS 102-1 may use the $FR1_0$ band for sending downlink signals to a UE in the first part 1002 of the interior region. Such downlink signals may be sent through the first antenna, which services the region 502-0. Similarly, the first BS 102-1 may use the $FR1_1$ band for sending downlink signals to a UE in the second part 1006 of the interior region. Such downlink signals may be sent through the second antenna, which services the region 502-1. The second BS 102-2, the third BS 102-3, and the fourth BS 102-4 may also use $FR1_0$ band and the $FR1_1$ band for sending downlink signals in the interior region 802 in the manner explained above. Similarly, the BSs in the other cells, such as the second cell 402 and the third cell 404, may utilize the $FR1_0$ band and the $FR1_1$ band for sending downlink signals in the interior regions of their respective cells.

A first exterior region of a cell may use one of the $FR3_0$, $FR3_1$, and $FR3_2$ bands. For instance, the first exterior region of the first cell 100 may utilize the $FR3_0$ band, the first exterior region of the second cell 402 may utilize the $FR3_1$ band, and the first exterior region of the third cell 404 may utilize the $FR3_2$ band. For instance, the first BS 102-1 may utilize the $FR3_0$ band for sending downlink signals to UEs in the first part 1004 of the first exterior region 808 and the second part 1008 of the first exterior region 808. Similarly, the second BS 102-2, the third BS 102-3, and the fourth BS 102-4 may send downlink signals to the UEs served by them in the first exterior region 808 in the $FR3_0$ band. Further, the BSs in the second cell 402 may send downlink signals to UEs served by them in the first exterior region 810 in the second cell 402 in the $FR3_1$ band. Also, the BSs in the third cell 404 may send downlink signals to the UEs served by them in the first exterior region 812 in the third cell 404 in the FR3₂ band.

The frequency planning is such that the network is able to reuse the spectrum with maximum efficiency for a given set of network performance parameters, such as inter-sector interference, Quality of Service, and network deployment requirements.

Figure 11:
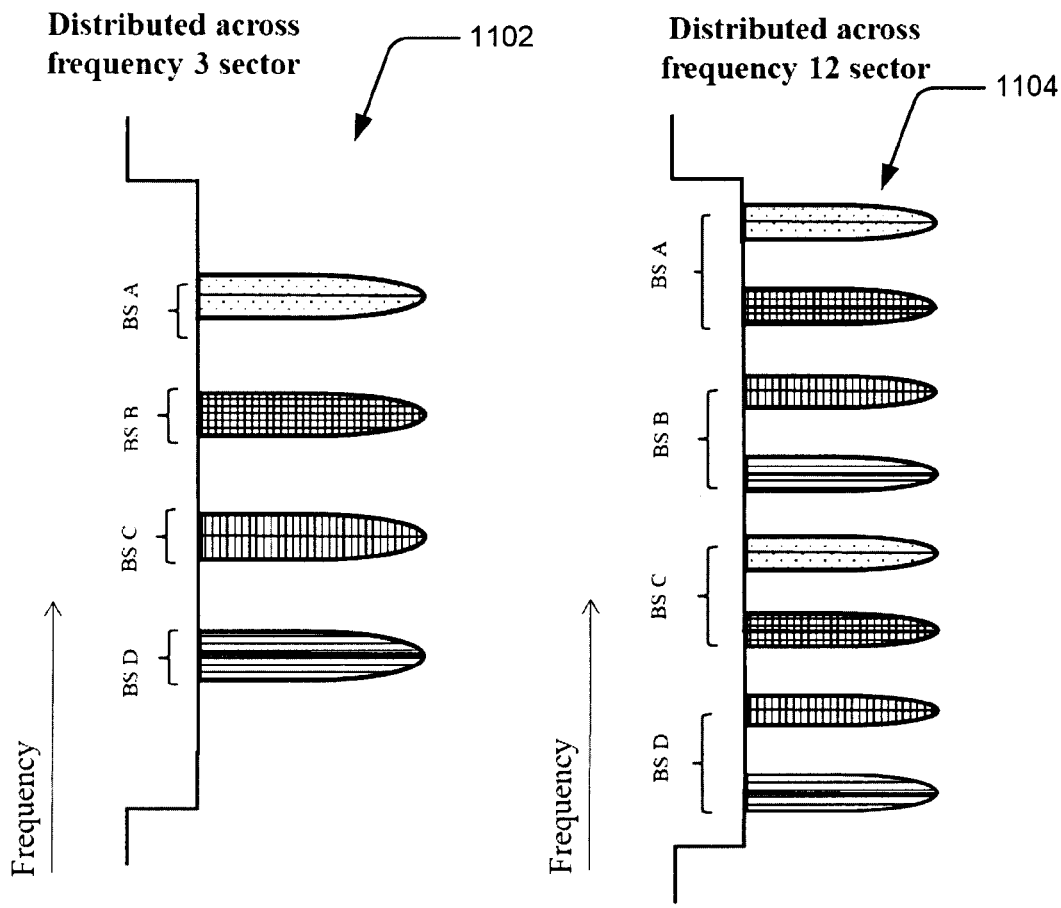
FIG. 11 illustrates a ranging signal structure for a three-sector model and a 12-sector model, in accordance with an implementation of the present subject matter.

FIG. 11 illustrates ranging signal structure, in accordance with an implementation of the present subject matter.

In uplink communication, ranging signal enables BSs to calculate the distance of UEs from the BS and update the UE with the appropriate timing advancement factor and/or transmit power. This is required so that the BS will be receiving the various transmitted signal from UEs at the same time irrespective of the location of the UE. The frequency distribution corresponding to a three-sector configuration is indicated by the reference numeral 1102. Each channel represents a frequency band that a UE can access in order to perform ranging. The channels are accessed only after the UEs connected to the BS either on periodic basis or on request basis. Reference numeral 1104 indicates ranging sub-bands available to access by a UE when the base stations have a 12-sector configuration.

Figure 12:
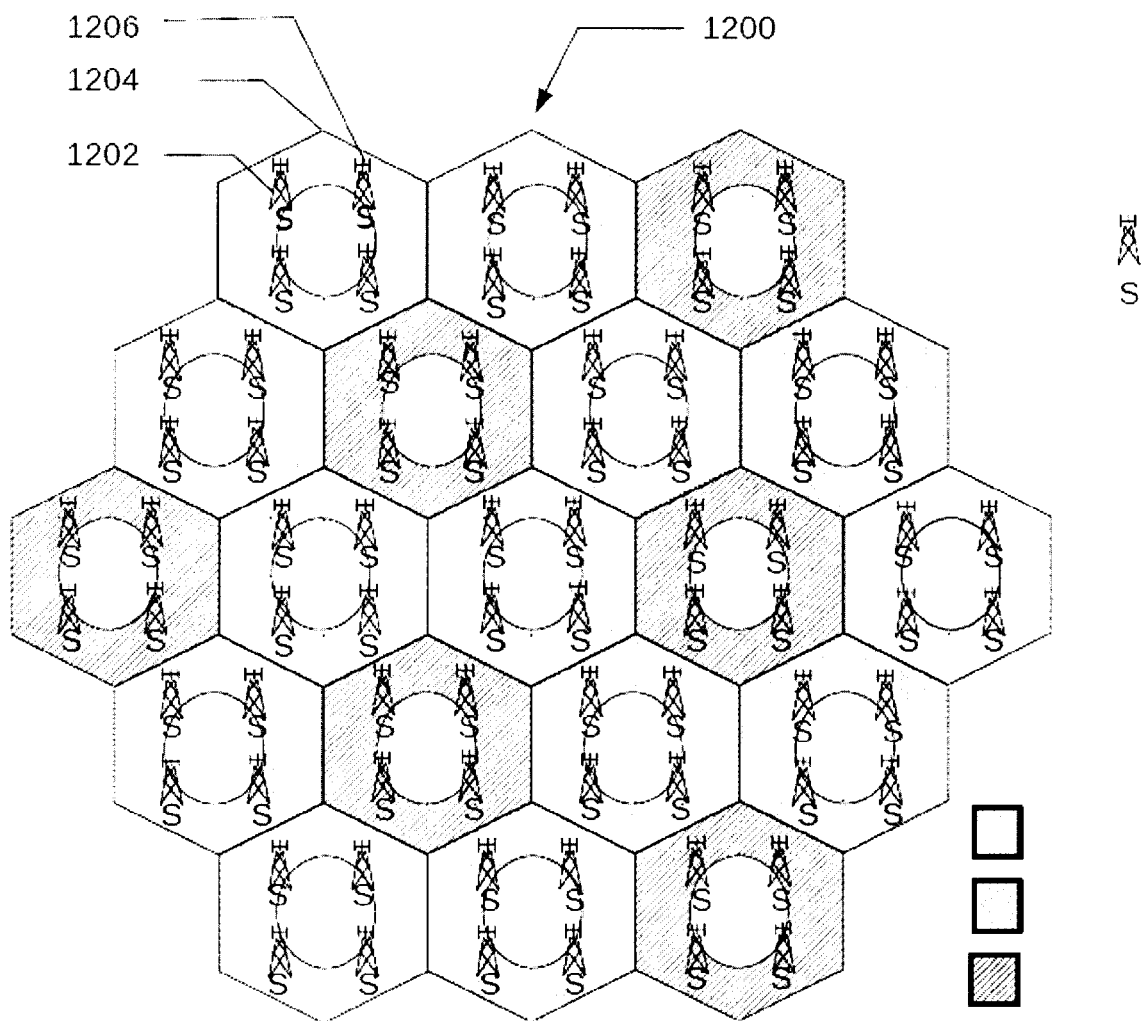
FIG. 12 illustrates a scenario in which multiple BSs of an operator are placed in each cell of the 19-cell network model, in accordance with an implementation of the present subject matter.

FIG. 12 illustrates a 19-cell network model for communication between a UE and an operator when there are dense macro base stations with overlapping coverage regions but belonging to a single operator and/or multiple Virtual Network Operators (VNOs), in accordance with an implementation of the present subject matter. The VNOs may manage services provided by an operator to its subscribers and may manage user base of the operator.

Each of the cell in the 19-cell cellular network includes BS of an operator S placed at a plurality of (e.g., four) locations within each cell. The locations of the operator S within each cell may be predetermined, and may be same in all the cells. The ION 208 may not be required in this case, as the entire spectrum is managed by a single operator and its base stations (BS). This model with the same operator distributed across the network is an ideal scenario through which a given geographical region may achieve 100% network coverage.

The scenario as illustrated in FIG. 12 enables a network with ultra-high throughput due to the careful placement of the BSs. This allows a mobile operator to provide reliable, high bit-rate wireless access using the same jointly licensed spectrum, where advanced signal processing and interference management techniques are used to control the impact of co-channel interference caused by this simultaneous (non-orthogonal) spectrum sharing.

The frequency planning, preamble planning, pilot planning, LLR sharing for the scenario as illustrated in FIG. 12 may be similar to that for spectrum sharing by multiple operators. For instance, a system may include a first Base Station (BS) 1202 in a first cell 1204 and a second BS 1206 in the first cell 1204. The first BS 1202 and the second BS 1206 belong to a common mobile network operator, such as the operator A, and are disposed at predetermined locations of the first cell 1204. The first BS sends downlink signals to a first UE in the interior region in a first band of a frequency spectrum and send downlink signals to a second UE in the first exterior region in a second band of the frequency spectrum. Further, the second BS is to send downlink signals to a third UE in the interior region in the first band and send downlink signals to a fourth UE in the first exterior region in the second band.

Figure 13:
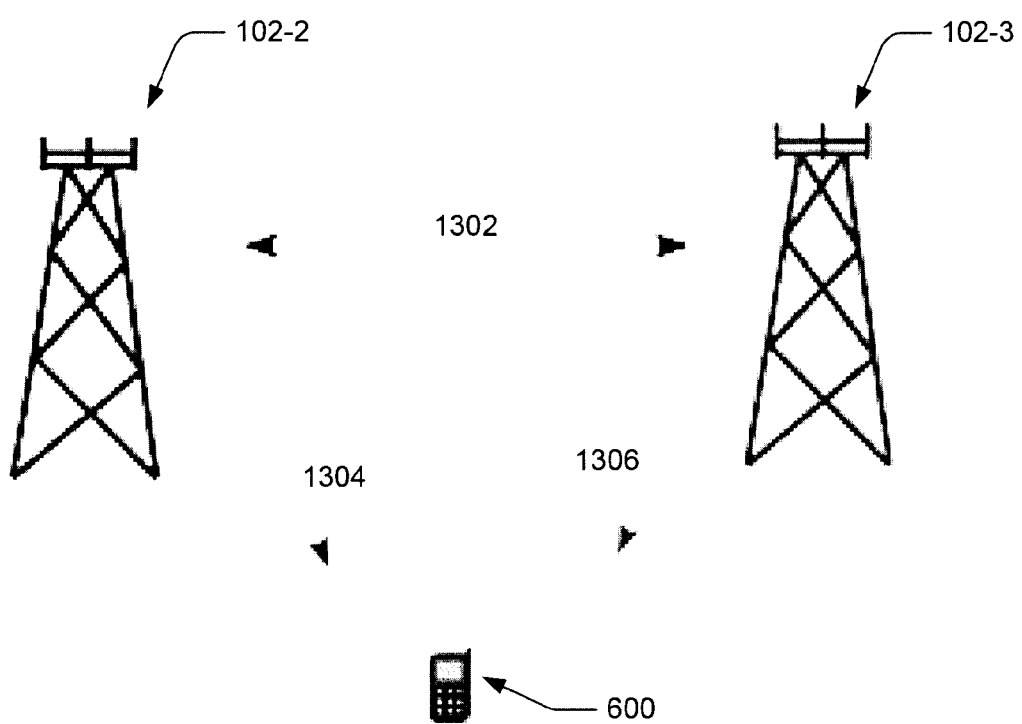
FIG. 13 illustrates leveraging techniques of the present subject matter in a UE having multi-SIM capability, in accordance with an implementation of the present subject matter.

FIG. 13 illustrates leveraging techniques of the present subject matter in a UE having multi-SIM capability, in accordance with an implementation of the present subject matter. In the conventional non-frequency sharing scenario, a dual-SIM UE, i.e., a UE using two SIM cards, either uses a single RF modem or a dual RF modem for processing the RF signal. In case of single modem, at any given time only one SIM can be served. In a dual modem case, both SIM cards can be served, but for two different applications, and not for a single application. In either case, the UE cannot aggregate the data from both SIM cards, because their respective sources, which belong to two different operators, are neither synchronized nor connected. Accordingly, the SIM cards are connected to two different networks and their IP (Internet Protocol) addresses will be different.

However, in the present subject matter, the UE 600 has a single IP address, regardless of whether the UE uses single SIM card or multiple SIM cards. The SIM cards used in the UE 600 may be referred to as a first SIM card and a second SIM card. The first SIM card may be issued by the first operator and the second SIM card may be issued by the third operator. In an example, the first SIM card may be served by the second operator due to Level-1 cooperation, as explained above. The serving of the UE 600 is explained as serving of the SIM card, as the UE 600 has two SIM cards.

Since the networks belonging to the different operators cooperate with each other for enabling Level-1 cooperation, a BS of an operator, such as the second BS 102-2, can re-route the IP packets to a different operator's BS, such as the third BS 102-3. The re-routing of the packets is illustrated by the double-headed arrow 1302. This enables the UE 600 to aggregate the data stream being destined for different SIM cards for a single application using a single RF modem, as represented by the arrows 1304 and 1306. Therefore, the UE 600 can receive a first data stream destined for the first SIM card and a second data stream destined for the second SIM card simultaneously. Both the first data stream and the second data stream may be received from the third BS 102-3, as the packets are re-routed from the second BS 102-2 to the third BS 102-3. Further, the UE 600 can aggregate the first data stream and the second data stream for use by a single application. This is achieved with lesser silicon foot-print (i.e. single modem only) and lesser power for the RF signal processing (because multi-SIM uses only one single RF modem).

Figure 14:
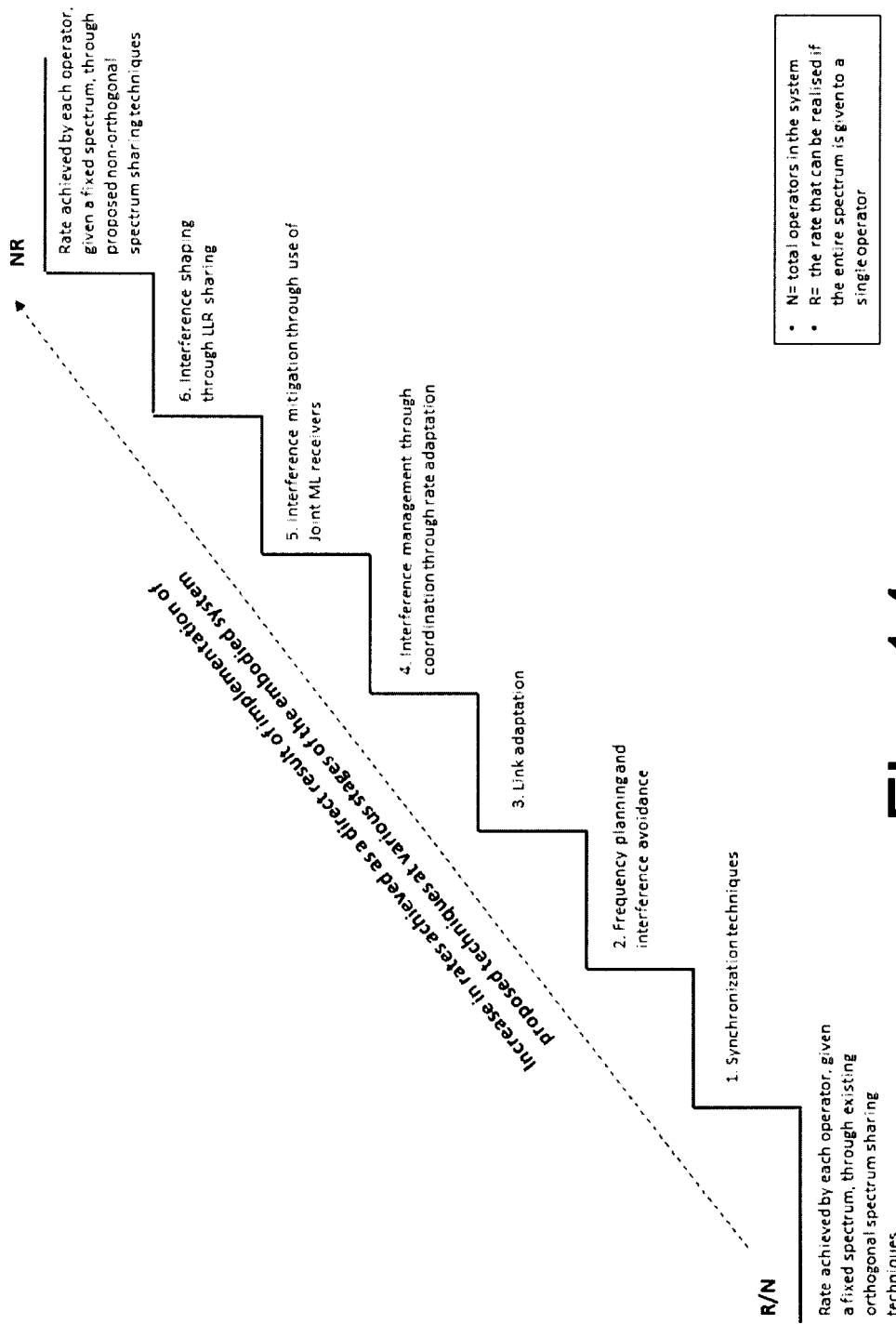
FIG. 14 illustrates improvement in throughput provided by utilizing various techniques of the present subject matter, in accordance with an implementation of the present subject matter.

FIG. 14 illustrates improvement in the throughput provided by utilizing various techniques of the present subject matter, in accordance with an implementation of the present subject matter.

In the present subject matter, the following signal processing techniques utilized in a systematic manner to enable a practical deployable communication system:

Synchronization is achieved by orthogonal preambles across sector and operator. This provides unambiguous detection of the signals from different operator BSs.

AFFR and Fractional Frequency Reuse (FFR) are used to avoid a portion of the interference signals. There is a compromise between spectral efficiency and interference avoidance. An optimal technique to handle both at the system level is provided.

Link and Rate adaptation is a complex procedure in interference-limited system and it is handled with an optimal manner through proper frequency planning and sub-optimal way of assigning modulation order in different sub-bands for the data symbols.

While JML receivers are well-known in communication literature, they cannot be integrated directly in an interference-limited system. The link adaptation of the present subject matter enables the direct use of JML in our interference-limited system.

LLR sharing enables one more level of interference shaping, which comes through a spatial diversity from a second SISO link.

The following table shows the throughput results obtained from the simulation studies.

TABLE 1

| Single Operator (no sharing of spectrum among operators) (in Mbps) | Simultaneous spectrum sharing among four different operators in three-sector model (in Mbps) | Simultaneous spectrum sharing among four different operators 12-sector model (in Mbps) | Scenario described with reference to FIG. 12 |
|---|---|---|---|
| Level- 120.5 | 228.16 | 598.54 | 864.48 |
| Level- 120.5 | 322.05 | 828.56 | 1053.61 |

Figure 15:
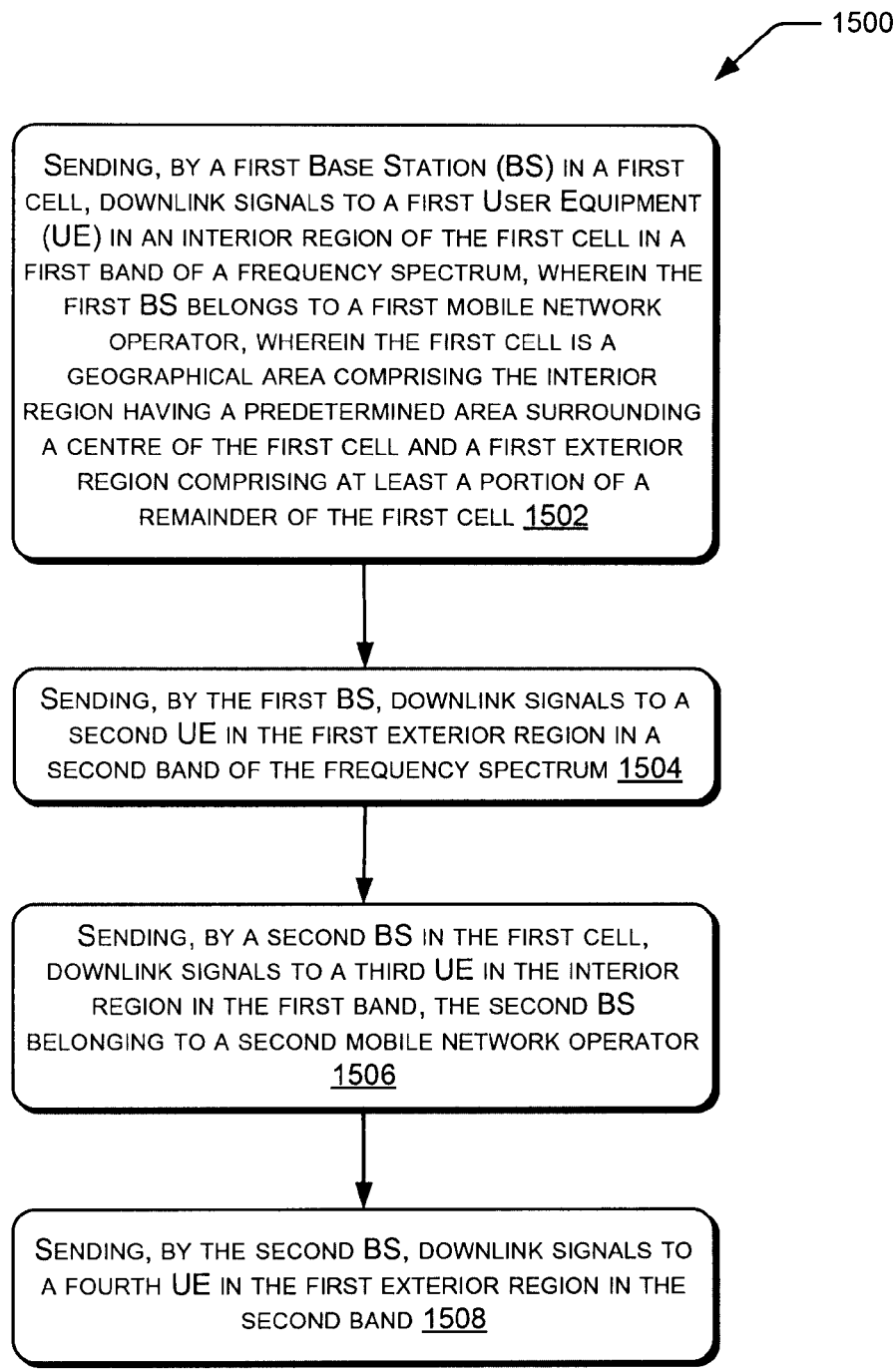
FIG. 15 illustrates a method for enabling simultaneous sharing of spectrum by multiple operators, in accordance with an implementation of the present subject matter.

FIG. 15 illustrates a method 1500 for enabling simultaneous sharing of spectrum by multiple operators, in accordance with an implementation of the present subject matter. The method 1500 may be performed by BSs of the operators that agreed to share the spectrum.

At block 1502, a first Base Station (BS) in a first cell sends downlink signals to a first User Equipment (UE) in an interior region of the first cell in a first band of a frequency spectrum. The first BS belongs to a first mobile network operator. The first cell is a geographical area including the interior region having a predetermined area surrounding a centre of the first cell and a first exterior region including at least a portion of a remainder of the first cell. The first BS may be the first BS 102-1. The first cell may be the cell 100.

At block 1504, the first BS sends downlink signals to a second UE in the first exterior region in a second band of the frequency spectrum.

At block 1506, a second BS in the first cell sends downlink signals to a third UE in the interior region in the first band. The second BS belongs to a second mobile network operator. The second BS may be the second BS 102-2.

At block 1508, the second BS sends downlink signals to a fourth UE in the first exterior region in the second band.

Figure 16:
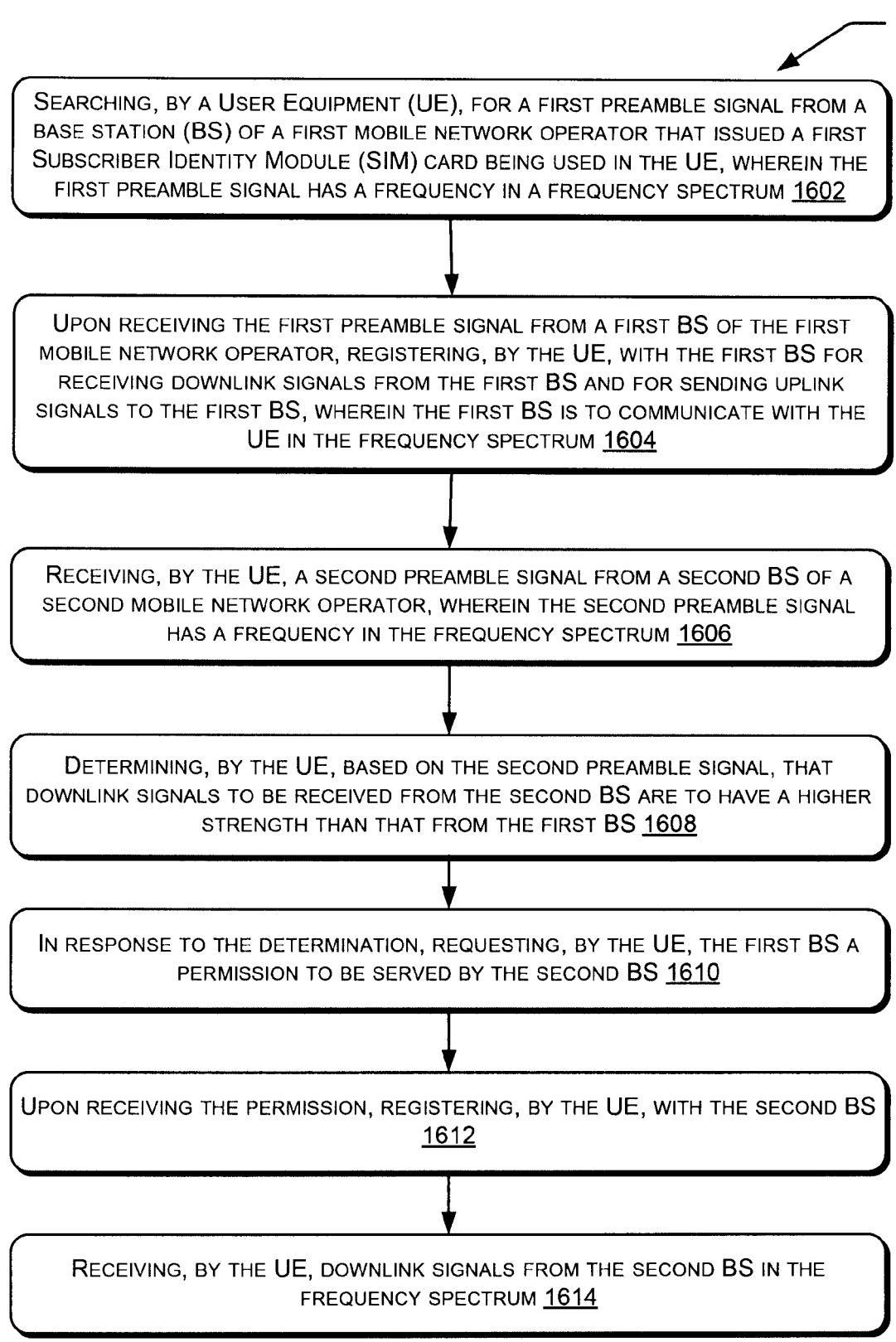
FIG. 16 illustrates a method performed by a UE when spectrum is simultaneously shared by multiple operators, in accordance with an implementation of the present subject matter.

FIG. 16 illustrates a method 1600 performed by a UE when spectrum is simultaneously shared of spectrum by multiple operators, in accordance with an implementation of the present subject matter. The UE may be the UE 600.

At block 1602, a UE searches for a first preamble signal from a base station (BS) of a first mobile network operator that issued a first Subscriber Identity Module (SIM) card being used in the UE. The first preamble signal has a frequency in a frequency spectrum.

At block 1604, upon receiving the first preamble signal from a first BS of the first mobile network operator, the UE registers with the first BS for receiving downlink signals from the first BS and for sending uplink signals to the first BS. The first BS is to communicate with the UE in the frequency spectrum. The first BS may be the first BS 102-1.

At block 1606, the UE receives a second preamble signal from a second BS of a second mobile network operator. The second preamble signal also has a frequency in the frequency spectrum. The second BS may be the second BS 102-2.

At block 1608, the UE determines, based on the second preamble signal, that downlink signals to be received from the second BS are to have a higher strength than that from the first BS.

At block 1610, in response to the determination, the UE requests the first BS a permission to be served by the second BS.

At block 1612, upon receiving the permission, the UE registers with the second BS. Subsequently, at block 1614, the UE receives downlink signals from the second BS in the frequency spectrum.

The present subject matter serves incoming traffic by sharing the network resources between different BSs. This will significantly reduce packet latency. Public Protection and Disaster Relief (PPDR) services can be supported. Since the UE can read signals from all the BSs in the vicinity, highly accurate user localization based on the terrestrial BS is made possible. Further, the present subject matter is cost-efficient because of the joint licensing which can reduce the ownership costs of premium bands below 1 GHz, and especially so in the TV-UHF band where re-farming of spectrum is possible.

In-band backhaul option is used either during initial network deployment, network expansion, or during natural calamities. This enables the network to function with lesser capabilities even when the default backhaul fails. This is achieved by using one or two sectors of a transmit BS as transmitting end of the backhaul and a special UE mounted on the other BS (nearly LoS) as receiver. During this period, some of the network functions (like BSC, MME, and the like) are emulated in the BS itself, based on the feasibility of these functions either ported or overlooked for normal operations.

Further, the present subject matter provides better throughputs to each operator compared to single-operator systems. The present subject matter would have much higher sum throughput when compared to a single network, using the same spectrum. For instance, in multi-operator BASIC (Broadband Access for Spotless Inland Coverage) technique, where multiple operators share a given spectrum (as explained above) a sum throughput of NX or more is obtained, where N is the number of cellular operators simultaneously sharing the given spectrum and X is the sum throughput of a single operator using the same spectrum without sharing.

Using the various levels of cooperation, the quality of service for packet communications can be enhanced, and also the exploitation of user load variations can be allowed across different cells to enable the operators to serve reliably, even in peak load conditions. The present subject matter provides a simple, ultra-reliable emergency broadcast service, as well as highly power-efficient uplink connections, which can provide greater than 20 dB higher link budget than any single-operator based deployment.

The present subject matter makes it possible to provide different services to the User Equipment (UE) from different operator networks simultaneously. This enables a significant reduction in the carbon footprint since the various UEs operate with a single RF front-end with added functionality thus having much lower hardware requirements.

The present subject matter facilitates simultaneous spectrum sharing networks at sub 1-GHz bands, where spatial diversity cannot be exploited to enable conventional MIMO (multi-input multi-output) links. Hence, the present subject matter focusses on SISO (single-input single-output) links, but enables the spatial diversity in a different aspect. For instance, the present subject matter enables having links which are similar to MIMO links (in higher bands). Generally, the interference is handled at the receiver (i.e., the UE) side. Such techniques cannot be scaled beyond a limit. In the present subject matter, the interference is shaped and aligned straight from the transmitter to the receiver. In the present subject matter, the big problem is broken down into many small problems, which can be handled at various levels with minimal complexity.

The present subject matter combines the following methods to enable a practical wireless access network in the presence of co-channel interference from different cellular network operators deployed in the same geographical area with required co-ordination from all other networks:

Detection of different networks and signals from different cellular base-stations in the given spectrum received on a downlink by a mobile.

Methods to estimate the wireless channel characteristics of various links in the presence of significant co-channel interference.

Methods to detect a desired stream of data without decoding the other streams of data, which are transmitted simultaneously.

Methods to process and combine the uplink signals received by different base-station receivers which are located at different locations from a mobile, to improve the reliability of bit detection.

The orthogonal downlink preambles enable the mobile system to process and detect the signals coming from the different base-stations and networks. In particular:

It enables the estimation of the co-channel interference power profile, while simultaneously allowing the mobile receiver to establish the identity of the various base stations and sectors sending these downlink preambles.

These preambles allow the mobile station to also recognise different networks, enabling the mobile station to eventually connect to any of these networks based on the performance metric required (for example, the metric can be best signal strength, load balancing, low latency, etc.)

The downlink preamble enables the mobile receiver for accurate timing synchronisation and frequency offset estimation for all the co-channel interference signals of significant strength.

The orthogonal preambles enable the mobile receiver to accurately realise a powerful non-linear joint estimator in a more computationally efficient manner.

The proposed preamble design allows the co-existence of different frequency planning schemes across the different operators.

The downlink preambles allow the estimation of a Channel Quality Index (CQI) that can be later used by the network to guarantee target Quality of Service (QoS) to the different users across the network.

These downlink preambles also enable highly accurate indoor user localisation—which is important for emergency services to reach the user or for security or safety services to reach the indoor user The pilot signals are non-overlapping with data subcarriers. The density of the reference signals is decided by the network configuration, and the proposed solution provides better channel estimation even in the presence of co-channel interference. The subcarriers used for the reference signals from different base-stations or different networks can be non-overlapping (orthogonal) or overlapping (non-orthogonal).

When non-orthogonal reference signals are used by the various transmitters, the mobile receiver can do a powerful yet computationally efficient joint channel estimation (JCE) algorithm. This JCE exploits the statistical properties of the different non-orthogonal signals to yield high quality channel estimates, even while providing higher spectral efficiency when compared to the orthogonal reference signal design.

The mix of orthogonal and non-orthogonal reference signals can be decided based on the deployment being planned. For example, the mix can be varied based on the number of sectors per base-station and/or based on whether single-operator BASIC (SO-BASIC) or multi-operator BASIC (MO-BASIC) is being deployed.

Rate adaptation based on CQI fed back from the mobile terminal to the base-station is an important aspect of any cellular network. Determining the rate (code rate and modulation order) at which a user can be served on the downlink or uplink in SO-BASIC and MO-BASIC, could be highly computationally complex problem since the system throughput is interference-limited.

However, by employing a novel network wide resource mapping scheme referred to as Controlled Interference Grouping (CIG), a computationally efficient CQI estimation and rate adaptation is enabled, which can be effectively implemented at the mobile receiver.

The rate adaptation procedure also depends on the QoS requirements of the user, the network load and traffic conditions, and on the capabilities of the hardware in the mobile terminal.

The modulation order in different sub-bands are predefined across operators. This enables the JML Receiver process possible and rate adaptation made feasible in the interference-limited network. The modulation order allocation on different sub-bands depends on various parameter of the network. For example, all operator can use only QPSK (Quadrature Phase Shift Keying) modulation alone. In other case, operators can use either QPSK or 16 QAM (Quadrature Amplitude Modulation) depending upon the signal processing capability of the UE.

The uplink reference signals, like the downlink reference signals, includes a mix of orthogonal and non-orthogonal subcarriers. Also, this signal can be received and processed by more than one BS and by more than one operator's network.

The uplink reference signals which are overlapping (non-orthogonal) are processed using a joint channel estimator (JCE) where the orthogonal reference signals indicate to the base station receiver the pilot symbol set(s) corresponding to the different overlapping signal(s).

The discovery of base station which can participate in the uplink processing for a given user is through a ranging signal, where the serving base station completes the ranging process, while the other base stations in the vicinity share the link quality details to the serving base station. The rate for the user is determined from the required QoS, network traffic and link quality between visible base stations. Generally, in the conventional LTE, the uplink QoS is poor due to lesser transmitted power and more variation in link quality from time to time. However, in the proposed system, the user is visible to multiple base stations, which are also capable of decoding the received signals from more than one mobile user in a given sub-band. This provides a new dimension in improving the uplink quality by simply sharing the Log Likelihood Ratio (LLR) between the serving base station and other visible base stations.

The LLR sharing mode is enabled by the serving BS, and is based on the link quality, target post-processing SINR, and rate. The LLRs are estimated at base-stations and the quantized or actual LLRs are shared through X2 or equivalent interfaces available between the base-stations and/or networks.

This uplink LLR sharing is also spectrally efficient since each base-station continues to serve its mobile users in the same resource even while generating LLRs for the co-channel signals from the mobile users connected to the neighbouring base-stations.

In interference-limited links where interference cancellation is employed, the modulation used by the interfering signal(s) is needed by the receiver in order to estimate correctly the interference contribution and remove it. In the proposed system, the interference signals are not estimated or decoded, but the information from the interference signals are used in decoding the desired signal using the ML principle. In this process, therefore, the coding rate of the interference signal(s) is not required for decoding the desired signal. Depending on the hardware resource availability and interference profile measured at the receiver, the configuration and complexity of the Joint ML receiver can be decided for both the DL and the UL receivers. This flexibility in achieving the target QoS is even higher on the UL since LLR sharing is also possible as mentioned earlier.

The spectrum sharing by multiple networks can be utilized to enable highly reliable public safety messages to be sent on the downlink. In this mode, the system can provide more than 4 times higher spatial diversity to a mobile receiver, even when the mobile receiver is employing only a single receive antenna and RF chain. For Public protection and Disaster Relief (PPDR) services, this additional spatial diversity available in the proposed system translates to 10 dB to 20 dB additional link margin when compared to the existing mobile cellular networks. This may be especially useful for locating users in the context of natural disasters like floods, land-slides, building collapses, etc.

Flexible and disaster-resilient network deployment with in-band back-hauling is possible using the present subject matter. In-band backhauling using the same sub-1 GHz spectrum will have a good link budget but could cause more co-channel interference. The interference management techniques in the present subject matter can manage this increased interference caused due to in-band backhauling.

The present subject matter has the capability to do in-band back-hauling, which enables the operator to expand the network seamlessly without waiting for a fibre (or any other wired) backhaul to be available at the tower location.

Depending on the user density the operator(s) can install additional base-stations to maintain the target QoS.

The in-band backhaul mode can be used as a stand-by mode, which can be enabled when the wired backhaul is not available (say, during natural calamities like floods or land-slides where the fibre to the tower may be cut or destroyed).

In existing mobile terminals, the Multi-SIM option typically means that for each SIM card (one from each operator), the UE would require a separate RF/IF transceiver chain. Moreover, when signals from/to multiple operator's base-stations are to be received/sent, the instantaneous power consumption on the hand-set becomes very high. In contrast, the present subject matter enables Multi-SIM option to be supported using a single RF/IF chain since all the operators share the same spectrum. Also, the power-consumption is managing different signals to be decoded from the different operators is also very low, since this involves only an increase in base-band processing ability (and there is no increase in RF/IF processing requirements). Thus, the present subject matter enables the realisation of very low power and low-complexity mobile receivers with Multi-SIM ability. Also, if the multiple operators can co-operatively serve the same mobile terminal, then the Multi-SIM based mobile terminal can also provide a much higher downlink throughput in a power-efficient manner.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

We claim:

1. A User Equipment (UE) comprising:
   a processor; and
   a memory having instructions stored thereon, the instructions being executable by the processor to:
   search for a first preamble signal from a base station (BS) of a first mobile network operator that issued a first Subscriber Identity Module (SIM) card being used in the UE, wherein the first preamble signal has a frequency in a frequency spectrum;
   upon receiving the first preamble signal from a first BS of the first mobile network operator, register with the first BS for receiving downlink signals from the first BS and for sending uplink signals to the first BS, wherein the first BS is to communicate with the UE in the frequency spectrum;
   receive a second preamble signal from a second BS of a second mobile network operator, wherein the second preamble signal has a frequency in the frequency spectrum;
   determine, based on the second preamble signal, that downlink signals to be received from the second BS are to have a higher strength than that from the first BS;
   in response to the determination, request the first BS a permission to be served by the second BS;
   upon receiving the permission, connect with the second BS; and
   receive downlink signals from the second BS in the frequency spectrum.

2. The UE as claimed in claim 1, wherein a second SIM card is used in the UE, wherein the second SIM card is issued by a third mobile network operator, wherein the UE comprises a modem to:
   receive a first data stream destined for the first SIM card, the first data stream corresponding to an application;
   receive a second data stream destined for the second SIM card, the first data stream corresponding to the application; and
   aggregate the first data stream and the second data stream for use by the application.

3. A method comprising:
   searching, by a User Equipment (UE), for a first preamble signal from a base station (BS) of a first mobile network operator that issued a first Subscriber Identity Module (SIM) card being used in the UE, wherein the first preamble signal has a frequency in a frequency spectrum;
   upon receiving the first preamble signal from a first BS of the first mobile network operator, registering, by the UE, with the first BS for receiving downlink signals from the first BS and for sending uplink signals to the first BS, wherein the first BS is to communicate with the UE in the frequency spectrum;

receiving, by the UE, a second preamble signal from a second BS of a second mobile network operator, wherein the second preamble signal has a frequency in the frequency spectrum;

determining, by the UE, based on the second preamble signal, that downlink signals to be received from the second BS are to have a higher strength than that from the first BS;

in response to the determination, requesting, by the UE, the first BS a permission to be served by the second BS;

upon receiving the permission, registering, by the UE, with the second BS; and receiving, by the UE, downlink signals from the second BS in the frequency spectrum.

* * * * *